(12) United States Patent
Branson et al.

(10) Patent No.: US 6,598,035 B2
(45) Date of Patent: Jul. 22, 2003

(54) OBJECT ORIENTED RULE-BASED EXPERT SYSTEM FRAMEWORK MECHANISM

(75) Inventors: Michael John Branson, Rochester, MN (US); Eric Howland Jenney, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/977,719

(22) Filed: Oct. 15, 2001

(65) Prior Publication Data

US 2002/0019815 A1 Feb. 14, 2002

Related U.S. Application Data

(62) Division of application No. 08/560,052, filed on Nov. 17, 1995, now abandoned.

(51) Int. Cl.[7] .............................................. G06F 17/00
(52) U.S. Cl. ........................................ 706/47; 706/46
(58) Field of Search ..................................... 706/46, 47

(56) References Cited

U.S. PATENT DOCUMENTS

| | | | | |
|---|---|---|---|---|
| 4,658,370 A | * | 4/1987 | Erman et al. ................... 706/60 |
| 4,866,635 A | * | 9/1989 | Kahn et al. ..................... 706/46 |
| 4,916,625 A | * | 4/1990 | Davidson et al. ............. 700/139 |
| 4,985,857 A | * | 1/1991 | Bajpai et al. ................... 706/47 |
| 5,043,915 A | * | 8/1991 | Suwa et al. ..................... 706/47 |
| 5,136,523 A | * | 8/1992 | Landers ........................... 706/47 |
| 5,379,430 A | * | 1/1995 | Nguyen ............................. 707/3 |
| 5,768,480 A | * | 6/1998 | Crawford, Jr. et al. ........ 706/47 |

OTHER PUBLICATIONS

Yep et al, "A Framework for Knowledge–Based Cell Controller for Flexible Manufacturing Systems", IEEE 2nd International Workshop on Design and Operations of Intelligent Factories, Sep. 1993.*

* cited by examiner

*Primary Examiner*—George B. Davis
(74) *Attorney, Agent, or Firm*—Martin & Associates, LLC; Derek P. Martin

(57) ABSTRACT

A framework for use with object-oriented programming systems provides an expert system shell that executes with a rule set developed by a framework user. The framework includes a condition manager object that keeps track of what conditions are true at any time and a rules compiler that processes the rules so they can be used by the condition manager. The conditions are a set of object classes that are organized into an inheritance hierarchy for use by the condition manager. A detector determines when to set conditions to true. When a condition state is changed, the condition manager realizes that one or more rules might indicate a particular action might now be appropriate. Therefore, the condition manager checks the rules against the conditions each time a condition changes. The expert system developer provides the set of rules and conditions appropriate for the knowledge domain of the expert system under development.

9 Claims, 16 Drawing Sheets

OBJECT ORIENTED RULE-BASED EXPERT SYSTEM FRAMEWORK MECHANISM

REFERENCE TO PARENT APPLICATION

This patent application is a divisional of a U.S. patent application with the same title, Ser. No. 08/560,052 filed on Nov. 17, 1995, now abandoned.

BACKGROUND OF THE INVENTION

1. Field of the Invention

The present invention relates generally to data processing and, more specifically, to object-oriented programming systems and processes.

2. Description of the Related Art

An expert system emulates human reasoning within a collected knowledge base. A man-machine interface permits human users to interact with the expert system, so the users can provide data on external conditions and receive conclusions or suggested actions. An inference mechanism applies search strategies to compare the status of the conditions against the knowledge base to arrive at conclusions. In this way, expert systems permit otherwise unavailable knowledge to be applied to complex problems in a variety of situations. Expert systems are suitable for application to a wide variety of tasks, including farm operation, inventory control, medical diagnosis, and computer configuration management.

The knowledge base in a rule-based expert system comprises a set of if-then rules. If certain conditions are true, then particular actions are recommended or conclusions are reached. Checking the status of the conditions against the set of if-then rules is performed by the inference mechanism. Thus, the inference mechanism must recognize and understand the set of if-then rules. The set of if-then rules can become quite extensive to permit the needed search strategies necessary to emulate human reasoning. For example, an expert system used in diagnosing bacterial infections includes several hundred rules. Other expert systems are known to have thousands of rules.

The representation of a knowledge base in terms of if-then rules is an important part of the development of any expert system, but much effort also is expended in developing the inference mechanism, the user interface, and other expert system program support features. The inference mechanism generally comprises relatively complex computer programming that must be able to understand the if-then rules of the knowledge base. The user interface should permit updating and correcting of the conditions and the knowledge base. Testing and evaluating the expert system programming and ensuring smooth user interaction can be a laborious and time-consuming process.

Many expert systems are developed in an iterative fashion, where the knowledge base and the conditions against which it is applied are slowly expanded as system prototypes are developed, tested, and refined. For example, a restricted initial rule set might be constructed and applied to each set of applicable conditions as the expert system is validated for the rule set. Thus, many expert systems are tailored for each particular application, from the user interface to the knowledge base to the inference mechanism.

An expert system shell, comprising general program support features, can be a starting point for expert system development, but much customization still is necessary. The inference mechanism and knowledge base, for example, often must be developed in tandem. The development of expert systems would be easier, cheaper, and faster if the user interface could be more consistent, development of the knowledge base made easier, and application of the inference mechanism standardized. Unfortunately, there currently is no expert system development platform available that can quickly and efficiently guide development of expert systems.

From the discussion above, it should be apparent that there is a need for an expert system development mechanism tool that provides a basis for more rapid and easy development of rule-based expert systems. The present invention satisfies this need.

SUMMARY OF THE INVENTION

In accordance with the present invention, a reusable object oriented (OO) framework for use with object oriented programming systems comprises an expert system shell that applies a rule set developed by a framework user against a user-defined set of conditions and thereby provides a more readily developed rule-based expert system. The framework includes a condition manager object that keeps track of what conditions are true at any time. The conditions are a set of object oriented classes that are organized into an inheritance hierarchy for use by the condition manager. A detector determines when to change the status of the conditions between true and false. The set of rules are if-then rules that are received by the condition manager. When a condition state is changed, the condition manager realizes that one or more rules might indicate a particular action might now be appropriate. Therefore, the condition manager checks the rules against the conditions. Different actions are called for depending on the outcome of the rule-condition checking. In this way, a single user interface can be used for multiple expert systems. Development of the knowledge base is made easier because the if-then rules need only be written so they can be recognized and interpreted by the condition manager class of the object oriented program. Thus, a standard inference mechanism is provided. Thus, expert systems can be developed more quickly and efficiently.

The expert system developer provides the set of rules and conditions appropriate for the knowledge base of the expert system under development. The framework provides the expert system shell comprising the condition manager, detector, and a rules compiler that processes the if-then rules so they can be used by the condition manager. In this way, an expert system developer can more quickly integrate a set of rules with an inference mechanism and provide an operable expert system.

In one aspect of the invention, the detector comprises a human operator who uses a man-machine interface to change conditions as the changes occur. For example, the conditions can comprise keyboard input responses to a medical diagnosis query video menu. In another aspect of the invention, the detector in a computer language checking expert system comprises a computer language parsing processor that receives computer program statements and provides parsed language statements to the condition manager.

The condition manager and rules compiler comprise a condition management facility that are provided as core classes, unchangeable by the expert system developer. The set of rules and conditions comprise extensible object oriented classes that are customized by the expert system developer.

Other features and advantages of the present invention should be apparent from the following description of the preferred embodiment, which illustrates, by way of example, the principles of the invention.

DESCRIPTION OF THE PREFERRED EMBODIMENT

Overview—Object Oriented Technology

Figure 1:
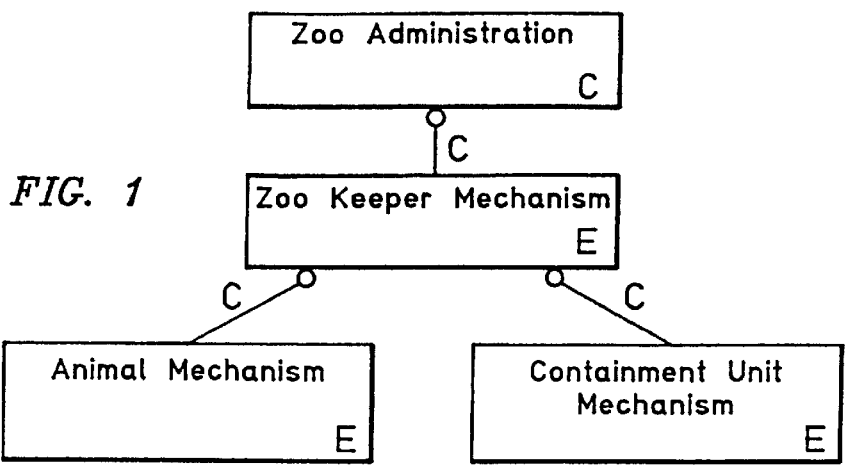
FIG. 1 is a category diagram of an exemplary Zoo Administration framework that illustrates the principles implemented by the system of the present invention.

As discussed in the Summary section, the present invention was developed using Object-Oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-Oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Stated another way, OO technology is significantly different from procedural technology because problems are broken down into sets of cooperating objects instead of into hierarchies of nested computer programs or procedures. That is, procedural technology defines a system in terms of data variables and process functions whereas OO technology defines a system in terms of objects and classes.

The Term "Framework"

There has been an evolution of terms and phrases which have particular meaning to those skilled in the art of OO design. However, the reader should note that one of the loosest definitions in the OO art is the definition of the word "framework." The word framework means different things to different people. Therefore, when comparing the characteristics of two supposed OO frameworks, the reader should take care to ensure that the comparison is indeed one of "apples to apples." As will become more clear in the forthcoming paragraphs, the term framework is used in this specification to describe an OO technology system that has been designed to have core function and extensible function. The core function is that part of the framework that is not subject to modification by the framework purchaser. The extensible function, on the other hand, is that part of the framework that has been explicitly designed to be customized and extended by the framework purchaser as part of its implementation.

OO Framework

While in general terms an OO framework can be properly characterized as a type of OO solution to a programming problem, there is nevertheless a fundamental difference between a framework and a basic OO programming solution. The difference is that frameworks are designed in a way that permits and promotes customization and extension of certain aspects of the OO solution, whereas a basic OO solution can be said to comprise a particular collection, or library, of classes and objects. In other words, frameworks provide an OO programming solution that can be customized and extended to address individualized requirements that change over time. Of course, the customization/extension quality of frameworks is extremely valuable to purchasers (referred to herein as framework consumers) because the cost of customizing or extending a framework is much less than the cost of a replacing or reworking an existing program solution.

Therefore, when framework designers set out to solve a particular problem, they should do more than merely design individual objects and specify how those objects interrelate. They should also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework rests not only on the quality of the object design, but also on the design choices involving which aspects of the framework represent core function and which aspects represent extensible function.

ZAF—An Illustrative Framework

While those skilled in the art appreciate that framework design is necessarily an intertwined and iterative process, example design choices for a simplistic framework are set forth in the paragraphs that follow. It should be understood, though, that this is only an example framework that is being used in this specification to illustrate and best explain frameworks such that the reader can better understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for the illustrative framework is that of zoo administration. The specific problem presented is that of designing a framework that assists zoo keepers in the care and feeding of zoo animals. In the example, which will be referred to as a Zoo Administration Framework (ZAF), an OO framework designer would look to the zoological problem domain and decide that any ZAF would of necessity involve an abstraction that represents the relationship between zoo keepers and animals (i.e., represents how zoo keepers care for animals). The framework designer would also likely recognize that zoo animals usually live in cages, pens, tanks, and other sorts of containment units. Therefore, the framework designer also would start with the idea that the framework would have to involve abstractions or mechanisms that represent all of these fundamental entities and relationships.

How ZAF is Designed

To begin the design process, the framework designer would likely begin with what is called a category diagram. Category diagrams are used to describe frameworks at a high level and to define how the framework components relate to one another. FIG. 1 is a category diagram for the example framework ZAF. The notation used in FIG. 1, and that used in the other figures of this specification, is explained in detail in the Notation section at the end of this portion of the specification. Each entity, or icon, in a category diagram represents groupings of data objects that perform a particular function. For the purposes of illustration, assume that the framework designer decides that ZAF should be made up of four components that, at a high level perspective, will be referred to as mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a "using" relationship with the zoo keeper mechanism. (Again, please refer to the notation section of this specification for an explanation of this relationship and the other notation used in this specification.)

As discussed above, the zoo administration mechanism has been designed to have responsibility for overall control of ZAF. Accordingly, the zoo administration mechanism is responsible for scheduling the operation of the zoo keeper mechanism. Note also that the framework designer has designed the zoo administration mechanism to be a core function of ZAF, which means that it has been designed such that it will not be subject to potential customization and extension. The upper case block letter "C" in the category box for the zoo administration mechanism denotes this fact. Note further that the "uses" relationship between the zoo administration mechanism and the zoo keeper mechanism also has been designed as a core function such that it is not available for ultimate customization by the framework consumer.

The zoo keeper mechanism has been designed to be generally responsible for the care and feeding of the zoo animals. Accordingly, it uses the animal and containment unit mechanisms to perform its tasks. Unlike the design of the zoo administration mechanism, however, the framework designer has designed the zoo keeper mechanism to be an extensible function, which again means that the zoo keeper mechanism has been designed to be available for modification and/or extension by the framework consumer to address future care and feeding requirements. This fact is denoted by the upper case block letter "E" in the zoo keeper mechanism category box.

The framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible functions, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

The framework designer next designs the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2:
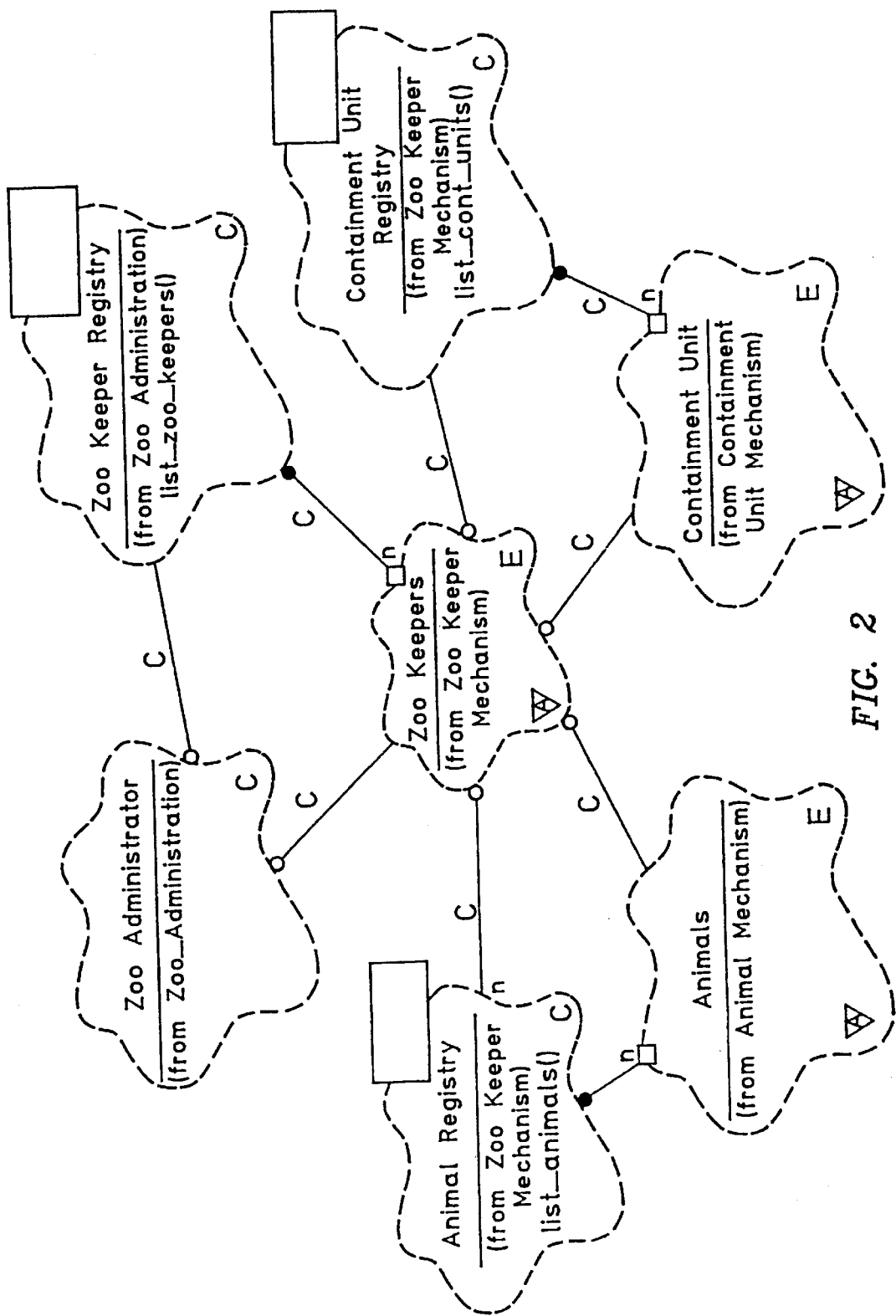

FIG. 2 is an OO class diagram that shows the fundamental classes that the framework designer has designed for ZAF. Each class representation indicates its relationship to the mechanisms shown on FIG. 1. For example, the zoo keepers class is denoted as being from the Zoo Keeper mechanism.

The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism. It should be noted that the relationships between the classes have been designed as core functions of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that one is able to understand how the objects of the framework mechanism have been designed to provide a living solution that can be customized and/or extended to address future requirements.

The zoo administration class has been designed to have a "uses" relationship with the zoo keeper registry. The framework designer has designed the zoo administration and zoo registry classes to be a core function of ZAF because the designer has decided that ZAF's consumers should not be allowed to modify the behavior of objects that are members of these class definitions. The zoo keeper registry, which has what is called a "contains by reference" relationship with the zoo keeper class, is simply a class that defines an object that is a container for all zoo keeper objects. Accordingly, the zoo keeper registry includes a definition for a list_zoo_keeper( ) operation. As will be described later, this operation is responsible for providing a list of zoo keeper objects to other objects that request such a list.

Figure 3:
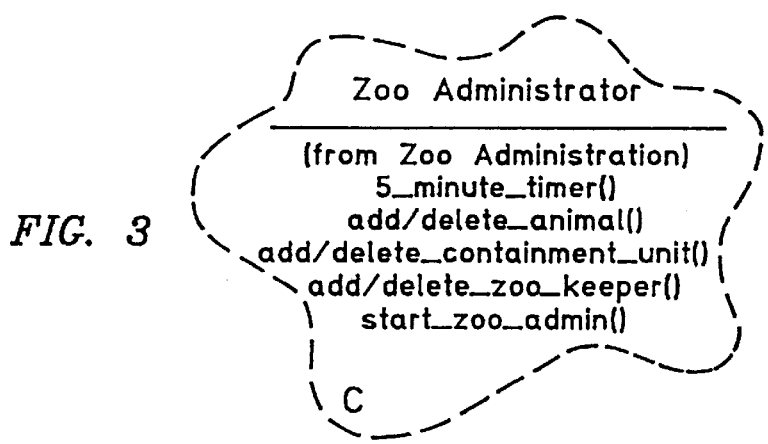
FIGS. 2, 3, 4, 5, and 6 are class diagrams for the exemplary Zoo Administration framework of FIG. 1.

FIG. 3 shows a lower level view of the zoo administrator class. Because objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo admin( ) operation is responsible for starting ZAF. That is, a user or system administrator will interact with the start_zoo_admino operation to begin administration of a zoo via ZAF. The start_zoo_admi( ) operation has been designed to initiate the 5_minute_timer( ) operation such that, every five minutes, the 5_minute_timer( ) operation instructs the zoo keeper objects to go out and check on the zoo animals. The add/delete_zoo_ keeper( ) operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. The ZAF framework designer has provided this flexibility by designing the zoo keeper mechanism as an extensible function.

Like the add/delete_zoo_keeper( ) operation, the add/delete_animal( ) operation is responsible for interacting with users to define additional zoo animal classes and objects and also to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, the framework designer has provided such flexibility by designing the animal and containment unit mechanisms as extensible functions.

Referring back to FIG. 2, the zoo keepers class definition has a "uses" relationship with the animal registry, animals, containment unit registry, and containment units classes. Since the value of ZAF is enhanced by allowing ZAF's consumers to customize and extend the zoo keepers, animals, and containment unit classes, the ZAF framework designer has designed these classes as extensible functions. However, changing the behavior of the animal and containment unit registry classes would disrupt the basic operation of ZAF. Therefore, the framework designer has designed these classes to be core functions of ZAF.

Figure 4:
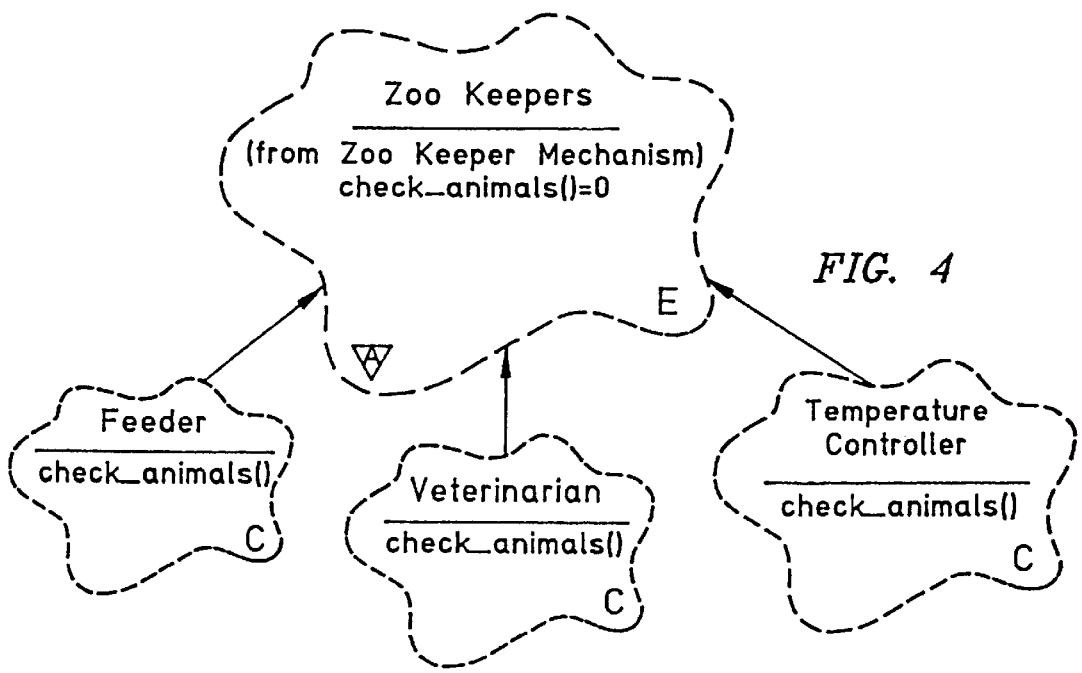

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals ( ) operation definition that is contained in the zoo keeper class. An operation is marked as a pure virtual operation when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object)

from the way in which the action is carried out (i.e., by one of the objects of the zoo keepers subclasses). Designs (such as the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact that the action is actually performed. In other words, client objects need only understand that certain objects perform certain functions, not how those functions are actually carried out. This is one way in which a properly designed OO framework can be readily customized and extended to satisfy future requirements.

Figures 5, 6:
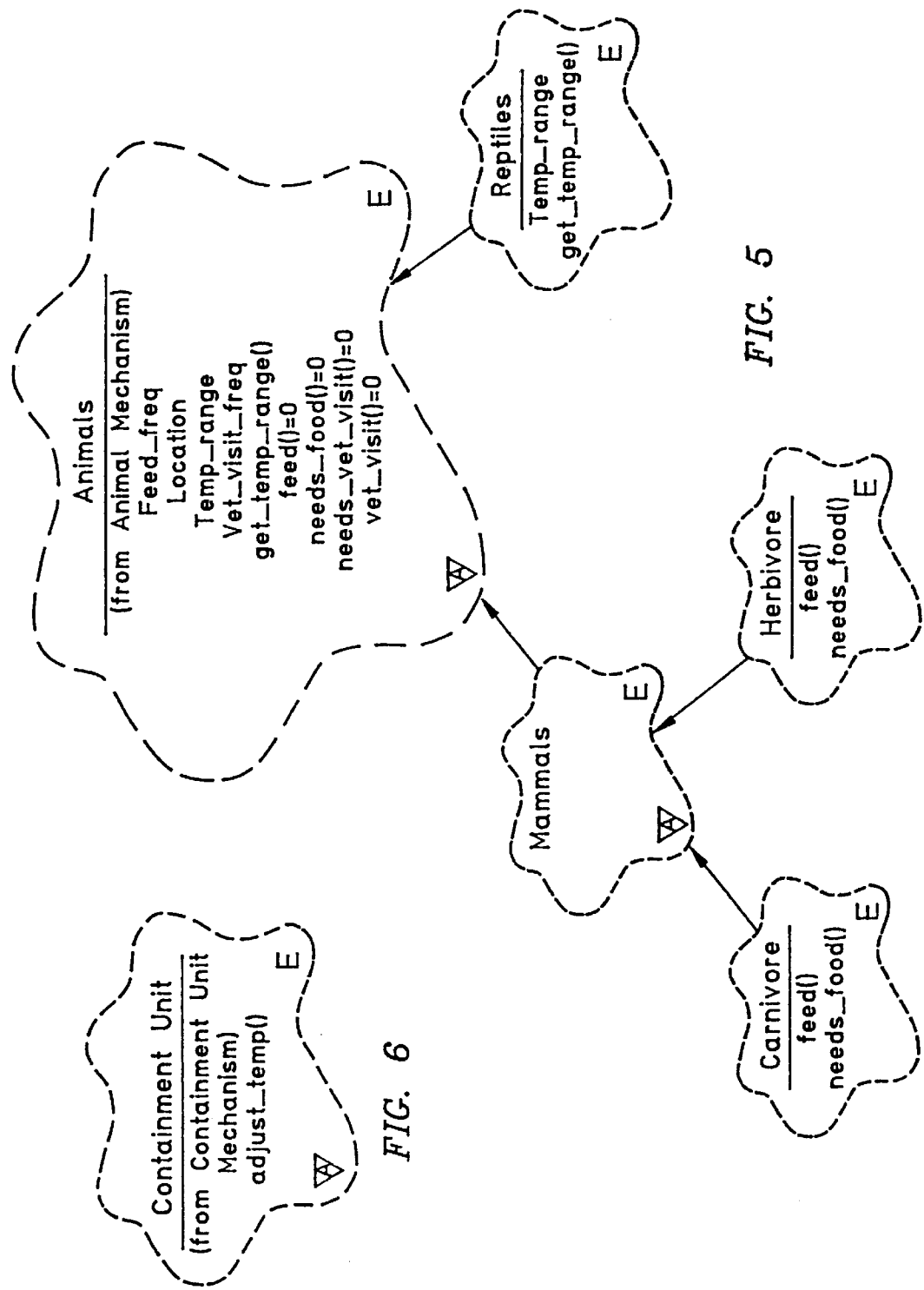

As previously discussed, the framework designer has designed the ZAF framework such that zoo keeper objects interact with animal and containment unit objects to perform their respective tasks. FIG. 5 is a class diagram for the class hierarchy of the abstract class animal. Because the animal class definition is responsible for representing the characteristics and behavior of zoo animals, the framework designer has designed the abstract class animal in a way that reflects this responsibility. As shown, the example class definition for animal includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp-range data definition and the get_temp_range( ) and feed( ) operation definitions are good examples of well thought out framework design choices.

The feed( ) operation definition is designed to perform the actual feeding of the animals (i.e., through specific feeding apparatus, which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In the ZAF framework, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extent the default operations by redefinition. Redefinition of a default operation is called overriding the default operation.

Mammals is a subclass of the class animals and, as such, the mammals class inherits all of the characteristics of the animals class. The mammals class is also designed as an abstract class, which again means that it has not been designed to have objects created as its members, but has instead been designed to provide a common interface for its subclasses. Subclass mammal is further subclassed into classes carnivore and herbivore.

Because definition of the feed( ) operation has been left up to the subclasses, the subclasses carnivore and herbivore each have their own definition of the feed( ) operation. Again, this is a good design choice because meat-eating carnivores are going to have different needs than their plant-eating counterparts.

Temp_range is a data definition for the range of temperatures that coincides with that of the specific animal's natural habitat and the get_temp_range( ) operation definition is designed to retrieve the temp range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the containment unit class. The containment unit class contains a virtual operation definition adjust_temp( ). The adjust_temp( ) definition defines both the interface and mechanism used to actually adjust the temperature in the containment units of the zoo (i.e., via heating and cooling mechanisms that are not shown).

How the ZAF Objects Interact

Beyond designing the objects that make up the solution to the specific programming problem, the framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7:
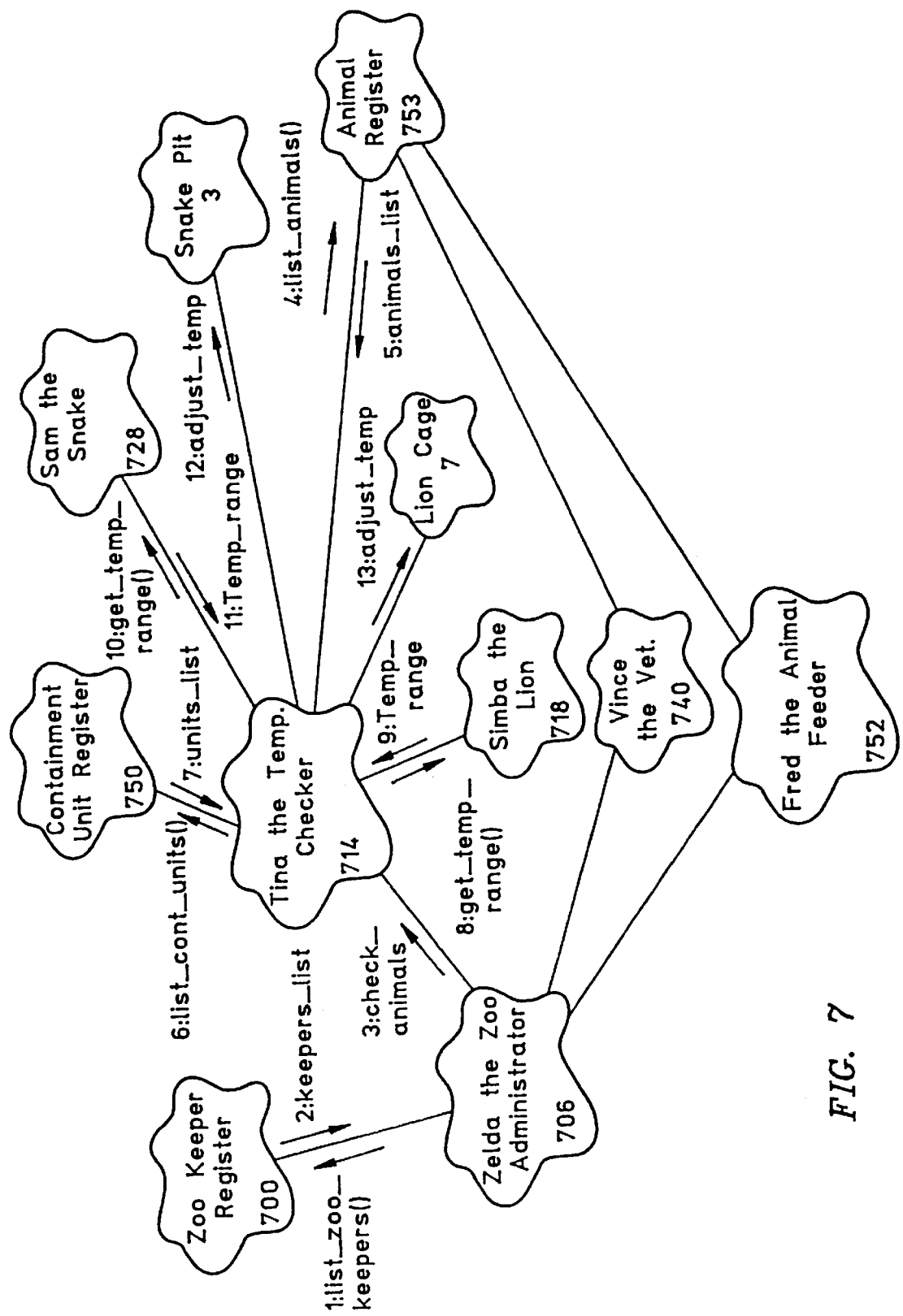
FIG. 7 is an object diagram for the exemplary framework of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects in an OO environment interact to solve problems.

As mentioned, an object is created to be a member of a particular class. Therefore, the object Zelda the Zoo Administrator 706 is an object that is a member (actually, the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object 700 has been created as a member of the zoo keeper register class. For the purposes of illustration, assume that this occurs every five minutes as part of Zelda's 5_minute timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda 706, object Zelda instructs each zoo keeper in the list to check the animals by calling the check_animals( ) operation of each zoo keeper object. Only the call to Tina the Temp. Checker is shown, indicated as step 3. It should be noted that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animal( ) operation. For example, object Tina's check_animals( ) operation retrieves a list of current animals from the animal registry object by calling the list_animals( ) operation [step 4] and then a list of containment units from the containment unit register object by calling the list_cont_unitso operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina 714 does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF system is an extremely simplistic framework that has been presented to help novice readers understand some basic framework concepts so as to better appreciate the benefits and advantages of the present invention. These benefits and advantages will become more clear upon reference to the following Detailed Description.

DETAILED DESCRIPTION OF THE PREFERRED EMBODIMENT

Figure 8:
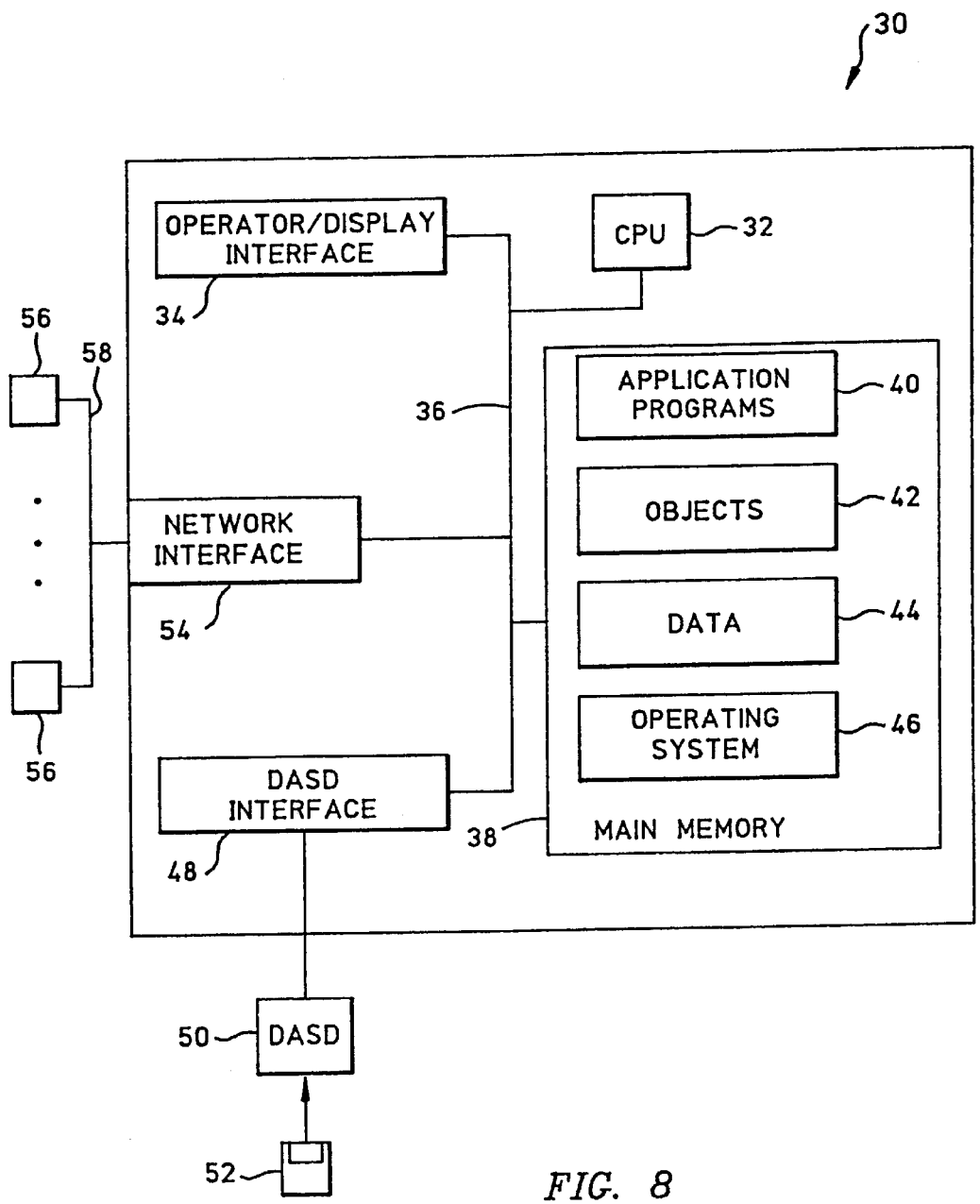
FIG. 8 is a functional block diagram of a computer processing system constructed in accordance with the present invention.

FIG. 8 is a block diagram of a computer system 30 constructed in accordance with the present invention. The computer system includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages, including C++. The objects 42 are objects of an object oriented programming language, such as C++, that encapsulate data and behavior.

The computer system 30 also includes a direct access storage device (DASD) interface 48 that is connected to the system bus 36 and also is connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation.

Figures 9, 10:
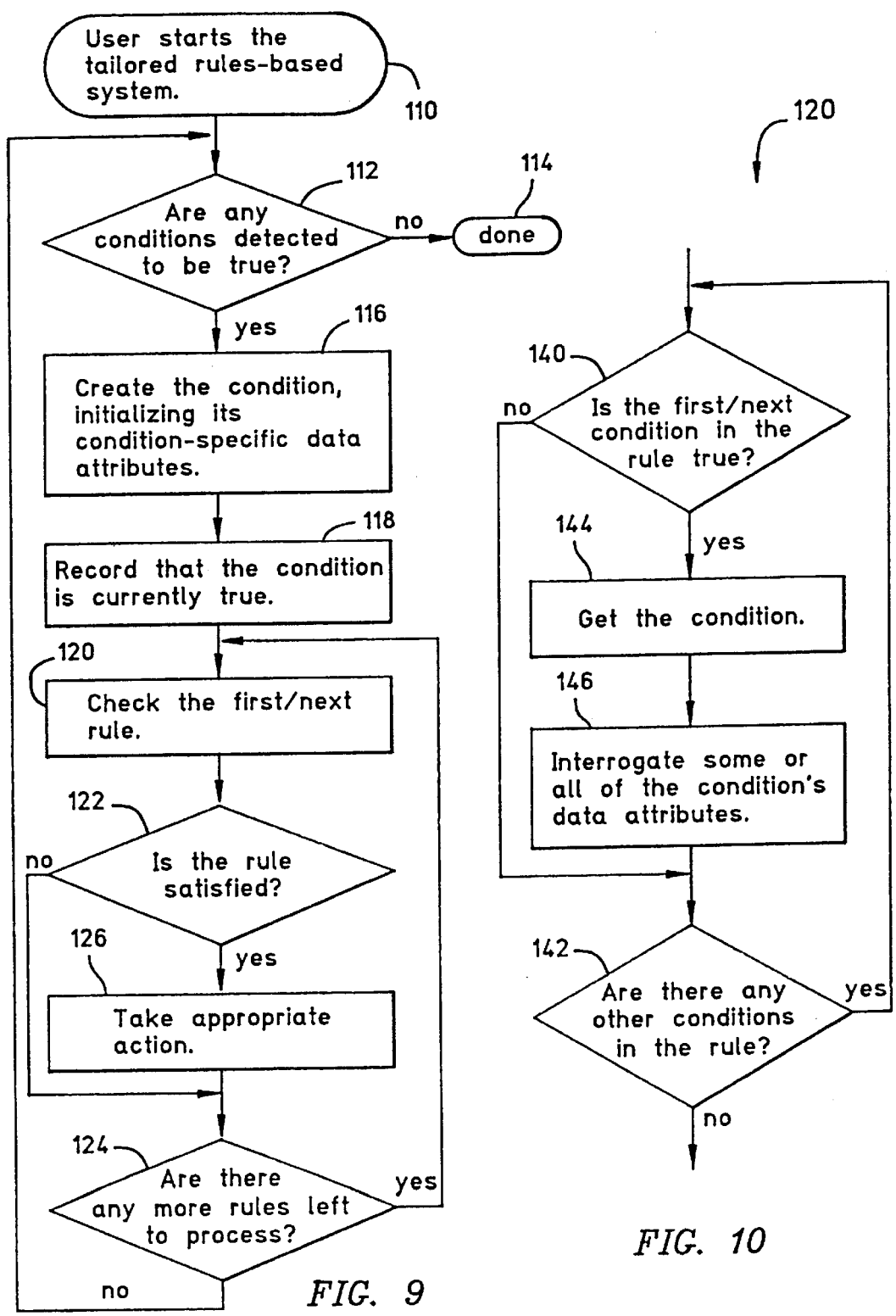
FIGS. 9 and 10 are flow diagrams that illustrate the processing steps performed by the framework mechanism of the computer processing system illustrated in FIG. 8.

FIG. 9 is a flow diagram that represents the processing steps executed by the computer system illustrated in FIG. 8 in performing rule-based expert system processing. Prior to operation of the computer system, a knowledge base comprising an if-then rule set must be developed, as well as a set of conditions that define the state of a system under study, and the rule set must be compiled with the conditions to produce an executable expert system program. The knowledge base is developed such that if particular rules are true, then certain actions are taken, and otherwise alternative actions are taken. For example, in the case of a medical diagnosis expert system, the outcome of some rules may depend on whether a patient has a fever. The developer therefore would include a condition class called fever. A rule might then test for the presence of a fever. If the patient has a fever, that is, if the fever condition is true, then additional rules may test for other aspects of the fever, such as the patient temperature and duration of the fever. The action recommended by the expert system will depend on the outcome of the additional rule testing. The exact format of the rule set and the condition classes will depend on the programming environment provided by the computer system. Those skilled in the art will be able to develop the rule set and conditions in accordance with their particular needs, in view of the description contained herein, without further explanation.

The first step of expert system processing shown in FIG. 9 is represented by the flow diagram box numbered 110, which indicates a user starting the system. This step presupposes loading of the rules and conditions into the system memory. The next processing step is represented by the decision box numbered 112, which shows a test to determine if any conditions are detected to be true. If no true conditions are detected, a negative outcome at the decision box 112, then operation of the expert system is concluded at the flow diagram box numbered 114. The box numbered 114 indicates appropriate completion processing, such as indicating that no conditions are true and that system operation is ceasing.

If one of the conditions is detected to have a "true" status, indicated by the affirmative outcome arrow leading from the decision box numbered 112, then the computer system creates the condition object. That is, in accordance with object oriented programming features, an instance of an object called a condition is created. For example, in a medical diagnosis expert system, a patient who has a fever might trigger a condition called "fever" to have a true status. In the condition creation processing step, the computer system initializes the condition-specific data attributes, as represented by the flow diagram box numbered 116. In the case of the medical diagnosis model, for example, the data attributes might include patient identification, the patient temperature, and the duration of elevated temperature.

In the next processing step, represented by the flow diagram box numbered 118, the computer system records that the condition status is currently true. Processing then continues with potentially iterative checking of rules associated with the condition, as represented by the flow diagram box numbered 120. That is, once a condition is true, the system may go further in interrogating a specific instance of the condition for each one of a set of rules associated with the condition. For the medical diagnosis expert system, for example, an interrogating, condition-specific rule might be "If there is a fever, what is the current patient temperature?" An additional interrogating rule might be "If there is a fever, what is the duration of the fever condition?" There might be several rules associated with a condition that is true. The number of additional rules to be checked in the processing for the box numbered 120 depends on the arrangement of the if-then rules.

For each of the rules associated with a condition, there will likely be one or more rules that result in some action being taken. In the case of the medical diagnosis model, the action might be the administering of certain medication or conducting a procedure. To determine if the action should be undertaken, the first processing step is to determine if the rule being checked is satisfied, as represented by the decision box numbered 122.

If the rule is not satisfied, meaning that the condition specified by the "if" portion of the if-then rule is not true, then processing resumes with checking for additional rules to process for the condition. This rule processing step is represented by the arrow leading from the negative outcome from the decision box numbered 122 to the decision box numbered 124. If the rule was satisfied at the decision box numbered 122, meaning that the "if" condition was true, then the computer system takes appropriate action in accordance with the system design and purpose, as described above. The execution of the computer system action is represented by the flow diagram box numbered 126 and can comprise, for example, advising the system user to take a particular action or indicating that a particular conclusion is proper. Processing then continues with checking for additional rules to process, represented by the decision box numbered 124.

At the decision box numbered 124, if there are no more rules left to process, then system operation returns to detecting true conditions at the decision box numbered 112. That is, the expert system waits for the next condition to be set to true. If there are additional condition rules to check, then processing returns to the flow diagram box numbered 120, where the next rule is checked for the current condition. For example, in the medical diagnosis model, the fever temperature might have been sufficiently high to call for medication, and the next if-then rule to be checked at box 120 might be associated with whether there is a rash present. The processing steps that comprise such iterative rule checking for each true condition, represented in FIG. 9 by the flow diagram box numbered 120, are illustrated in greater detail in FIG. 10.

In the first processing step illustrated in FIG. 10 that represents condition rule checking, the computer system determines if the current if-then rule is true. This processing step is represented by the decision box numbered 140. If the condition is not true, then processing follows the negative outcome arrow from box 140 to the decision box numbered 142, which indicates that the system determines if there are any other conditions in the rule that remain to be checked. If there are no other rule conditions to check, then checking for the current rule is completed and processing can continue with the flow diagram of FIG. 9 at the decision box numbered 122. If there are more conditions to be checked, an affirmative outcome at box 142, then processing returns to the decision box numbered 140, where the next condition is checked.

If the current condition in the rule being checked is true, an affirmative outcome at the FIG. 10 decision box numbered 140, then the computer system retrieves the condition at the flow diagram box numbered 144. That is, the condition data attributes are made available to the inference mechanism. The attributes can comprise more than simply a true/false status. In the process of rule checking, the fact that a particular condition is true is not all that the rule may be interested in. Certain details about the condition may also be important to a rule. These details are packaged as attributes of a condition object. Each subclass of the base Condition class defines a set of attributes that further describe the condition. The unique attributes of a condition object are interrogated by the rules by calls to C++ member functions. These member functions are part of the interface to a condition subclass. They return values of the object's attributes that reflect the current state of the object. This processing is represented by the flow diagram box numbered 146.

For example, in the medical diagnosis model, a fever condition might have rules that inquire as to the elevated temperature, duration of the temperature, and presence of accompanying symptoms. The sequence of rules checked might comprise a sequence such as "If there is a fever of greater than 100° F., and if the fever has persisted for more than three hours, and if the fever is accompanied by a rash, then . . . " It should be apparent that this sequence of rules can be represented as an iterative loop of this flow of processing is indicated by the loop from decision box 140, to the condition box 144, to the interrogation box 146, through additional rule condition checking at box 142, and back to decision box 140.

The present invention provides an object oriented framework. The operation of the expert system developed using the framework can be understood with reference to the procedural flow diagrams of FIG. 9 and FIG. 10. Persons skilled in the art, however, will appreciate that the framework objects, their relationships, and their processing also can be precisely and completely described in terms of object oriented programming representations. Therefore, the framework of the preferred embodiment will next be described in terms of category diagrams and object diagrams similar to those described above in conjunction with FIGS. 1 through 7 for the zoo keeper example.

Figure 11:
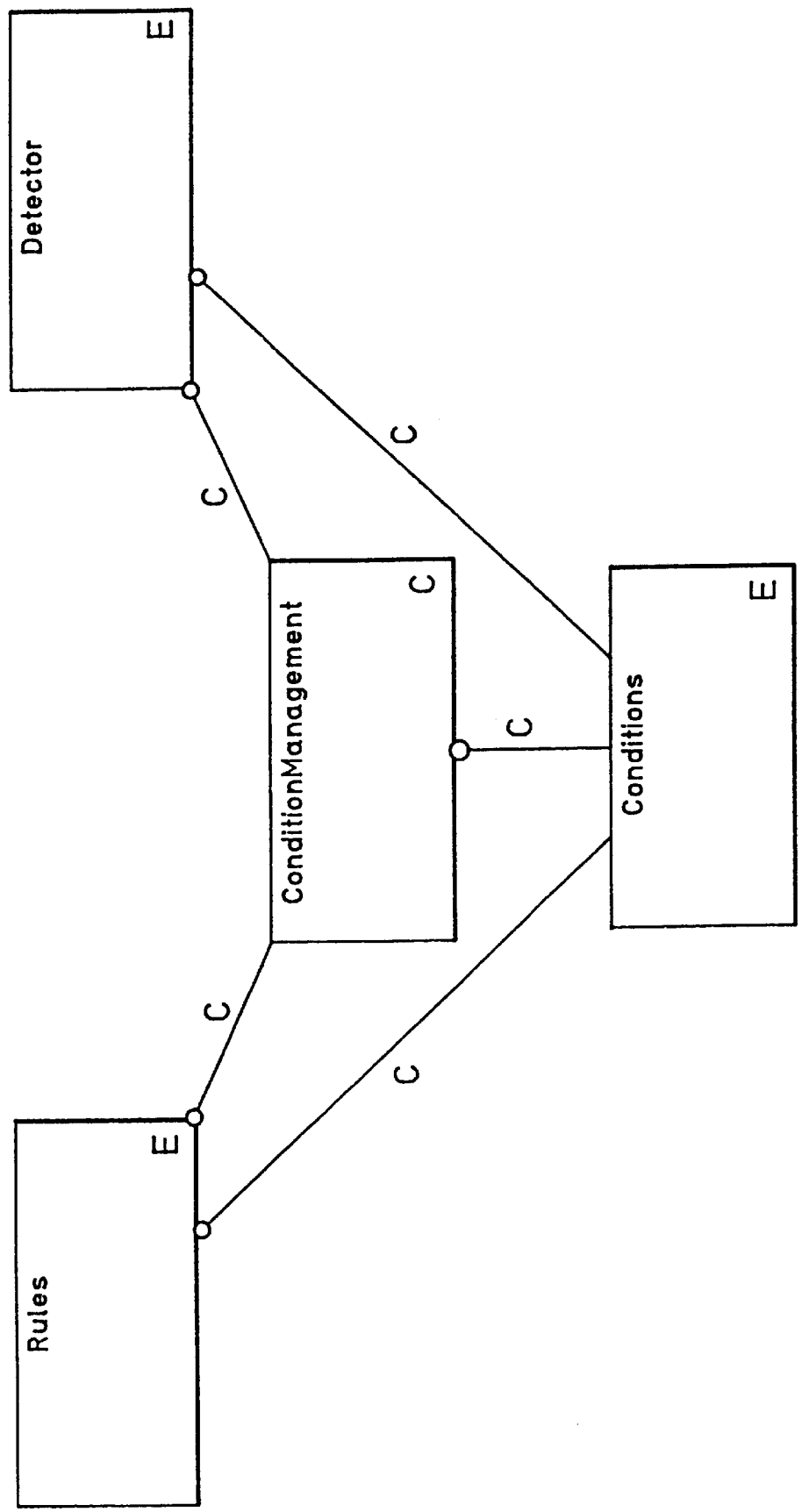
FIG. 11 is a top-level category diagram representation of the framework mechanism of the computer processing system illustrated in FIG. 8.

FIG. 11 is a category diagram for the framework implemented in the computer system of FIG. 8. Those skilled in the art will appreciate that the categories illustrated in FIG. 11 correspond to object oriented programming (OOP) objects that encapsulate data attributes and behaviors, and are stored in the memory 38 illustrated in the block diagram of FIG. 8. Such objects can be implemented, for example, in a computer system operating environment that supports the C++ programming language.

The framework includes four primary components, or mechanisms, comprising a ConditionManagement mechanism, which also will be referred to generally as a condition management facility, a Conditions mechanism, a Rules mechanism, and a Detector mechanism. The condition management facility keeps track of the Conditions, which comprise a set of conditions that define the state of the system under study. The condition management facility also checks the Conditions against the Rules, a set of if-then rules that are provided by the framework user. The Detector mechanism determines when the state of the Conditions changes and provides information concerning those changes to the condition management facility. The Detector, set of Rules, and Conditions to be checked are all specified by the framework user, subject to the organization of the framework itself, and therefore are designated as extensible classes (indicated with the "E" in their respective category boxes).

When the state of a condition changes, the condition management facility realizes that one or more rules now might indicate a particular action might be appropriate. Therefore, the condition management facility takes the condition change as an opportunity to check the rules against the conditions. The action taken, if any, depends on the outcome of the rule checking, as described above. As noted, the expert system developer provides the set of rules and conditions appropriate for the expert system under development.

The FIG. 11 category diagram shows that the ConditionManagement mechanism has a "using" relationship with the condition-containing Conditions mechanism. The "using" association relationship indicated by the connecting lines from the category ConditionManagement to the category Conditions represents an association in which the condition management facility called ConditionManagement processes, or uses, objects from the Conditions class. Because the Conditions category is provided by the framework user, it is shown as an extensible class, indicated by the "E" in the diagram box.

FIG. 11 shows that the Conditions mechanism also has a "using" relationship with the mechanisms called Rules and Detector. Rules also is an extensible category. The Rules provided will depend on the knowledge base intended for the expert system. For example, the Rules may relate to medical diagnosis of a patient. In the preferred embodiment, the Rules are if-then-else statements recognized by the ConditionManagement mechanism. Similarly, the Conditions are preferably written so they can be compiled and represented as statements recognizable by the ConditionManagement mechanism. In particular, if the framework is implemented in the C++ programming language, it is anticipated that the Rules and Conditions will be written in a subset of C++ statements. Using the same programming language to specify the Rules and also to provide the framework shell is advantageous because all of the programming code, the Rules, the Conditions, and the Condition-Management processing, can be written in the same language and can be compiled together into a single program.

The Detector mechanism also is supplied by the framework user and therefore is shown as an extensible class. The Detector can be simply a user interface through which data is provided to the system. For example, in the medical diagnosis model, the Detector could be a medical professional who inputs diagnosis data. Thus, the Detector does not have to be a sequence of object oriented programming language statements. When the Detector finds certain conditions to be true, it notifies the condition management facility.

In FIG. 11, only the ConditionManagement mechanism is indicated as being a core mechanism. Thus, the framework user is provided only with one core category. All of the other mechanisms, the Detector, Rules, and Conditions, are indicated as extensible. As noted above, this means that the framework user is free to customize the objects of these mechanisms.

Figure 12:
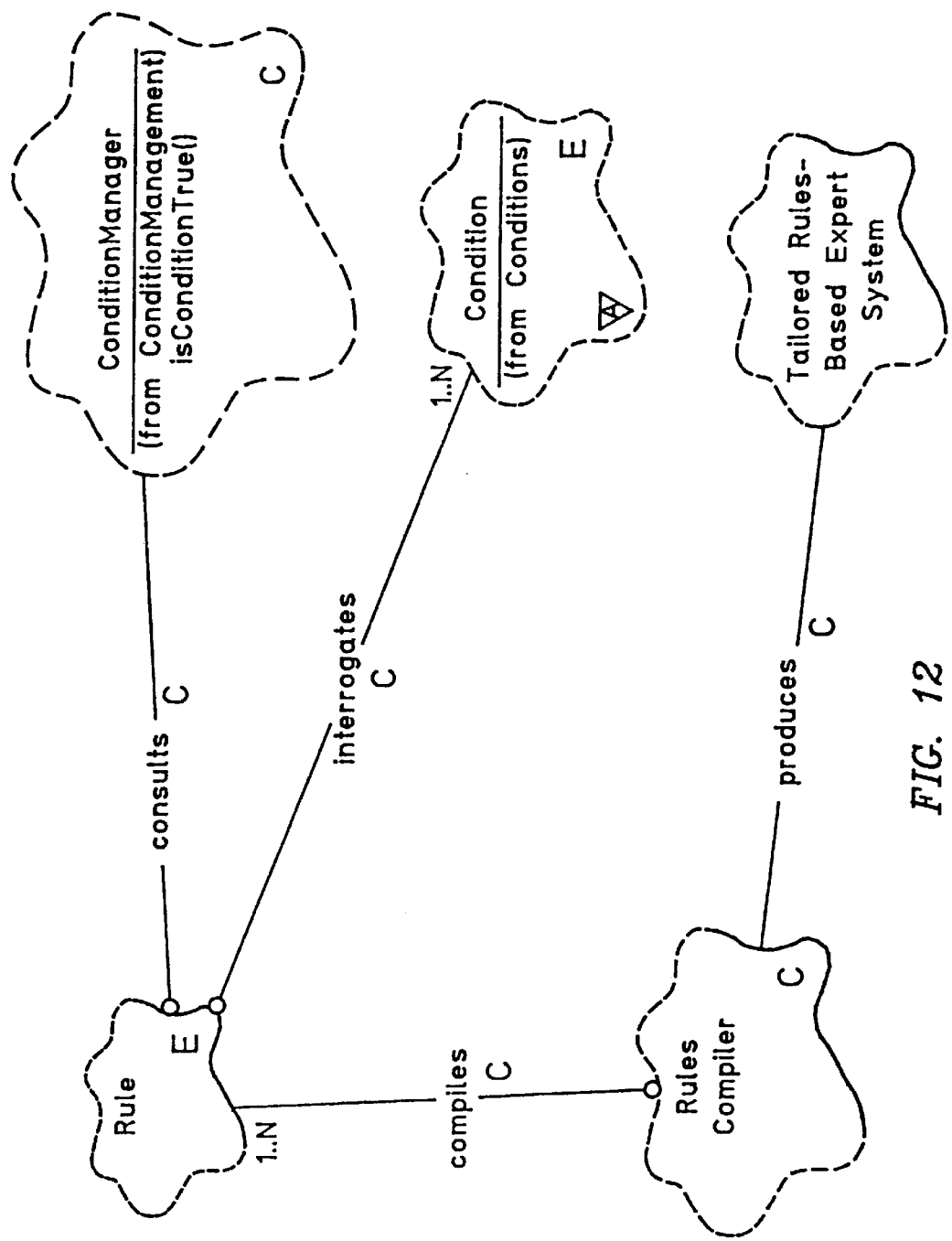
FIG. 12 is a class diagram representation of the Rules category implemented by the computer processing system illustrated in FIG. 8.

FIG. 12 is a class diagram that illustrates further characteristics of the classes called ConditionManager and Rule. The class cloud for ConditionManager indicates that it is "from" ConditionManagement, meaning that the Condition-Manager class belongs to the ConditionManagement category. The "C" in the class cloud indicates that it is a core class provided by the framework provider. The class cloud also shows that the ConditionManager class includes an operation or method called is condition True( ). The is ConditionTrue( ) method begins the condition diagnosis processing steps for the framework mechanism implemented by the processing system of FIG. 8. FIG. 12 shows that the ConditionManager class has a "uses" relationship with the Rule cloud. In particular, the relationship is labelled as "consults" to better describe the nature of the relationship and indicate that the ConditionManager consults the Rules.

The Rules mechanism shown in FIG. 11 is a set of if-then statements that also comprise the Rule class of FIG. 12. The Rule cloud in FIG. 12 is shown with edge shading along a lower portion of the cloud. Those skilled in the art will appreciate that the shading indicates these objects are class utilities (in accordance with Booch notation, for which see below) and therefore are not necessarily object oriented classes. The "E" in the Rule cloud indicates that the Rule set is extensible, meaning they are provided by the framework user.

Because the Rule set is extensible, it should be understood that the framework user will provide the Rule statement set. That is, the framework user must determine what rule set is appropriate to the expert system that will be tailored. In the preferred embodiment, the Rule set comprises a set of computer program if-then-else statements that are compiled by a Rules Compiler, which is shown in FIG. 12 as being a class utility. In the preferred embodiment, the framework mechanism includes program instructions written in an object oriented computer language such as C++, and therefore the Rule statements also are written as C++ statements. Thus, the Rules Compiler class utility receives the Rule set provided by the framework user and subjects them to a compilation process. The Rules Compiler receives the Rule set from the system user interface described above.

The compilation process comprises checking the Rule statements for proper syntax and definition and for linking them to the rest of the framework. The result of the compilation process is indicated in FIG. 12 as the class utility called TailoredRulesBasedExpertSystem, which therefore comprises a compiled program. In particular, the compilation process produces an executable expert system program such that the outcome of execution is communicated to a system user via the system user interface. It should be noted that the TailoredRulesBasedExpertSystem cloud has shading to indicate that it also is a class utility and therefore is not necessarily an object oriented class.

In FIG. 12, the Rule set is shown having a "uses" relationship with the class called Condition. The Condition class is shown as being "from" the Conditions mechanism illustrated in FIG. 11, meaning that it belongs to the Conditions category. The Condition class also is labelled as an abstract base class. FIG. 12 indicates that the Condition class includes a set of objects numbered 1, 2, 3, . . . , N, which will be referred to as conditions of the system being studied. The conditions comprise objects that define attributes of the system being studied, such as a patient in the case of the medical diagnosis model. The relationship between the Condition class and the Rule set is shown as a "uses" relationship and, more particularly, is labelled "interrogates" to make it clear that the Rule objects interrogate the Conditions. That is, the framework includes programming that compares the status of Condition objects against the if-then clauses of the Rule set to determine if a condition satisfies a rule clause. Depending on the outcome of the comparison, additional interrogation may occur or system action (such as providing a recommended activity to the expert system user) may occur.

Figure 13:
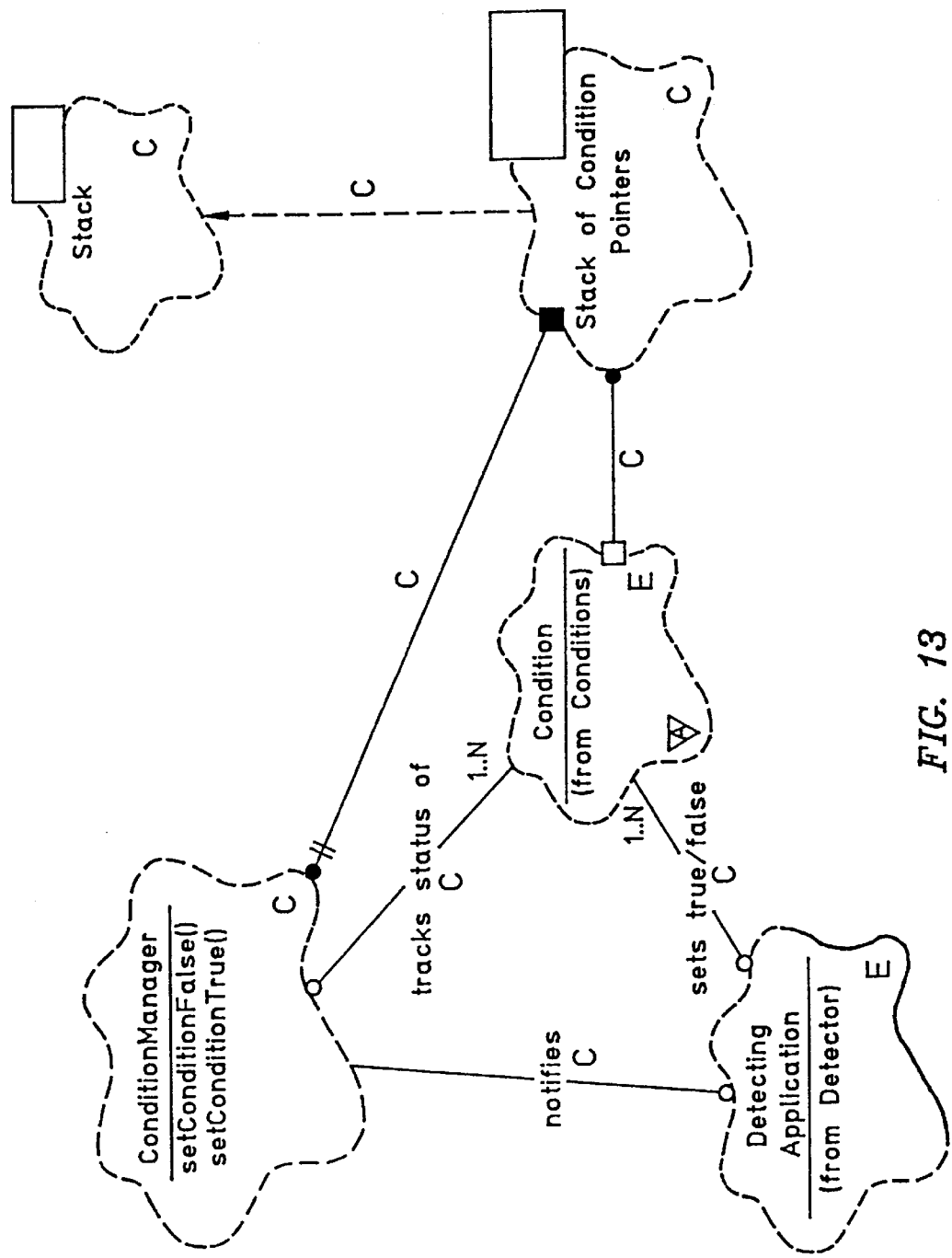
FIG. 13 is a class diagram representation of the ConditionManager category implemented by the computer processing system illustrated in FIG. 8.

FIG. 13 shows further details of the relationship between the class Condition and the class ConditionManager and other objects. A class utility called DetectingApplication is shown as being from the Detector mechanism illustrated in FIG. 11, meaning that the class utility DetectingApplication belongs to the Detector category. DetectingApplication is indicated as having a "uses" relationship with ConditionManager, which is labelled as "notifies" on the connecting line between the ConditionManager class cloud and the DetectingApplication cloud. Note that ConditionManager is shown with two methods, a setConditionFalse ( ) method and a setConditionTrue( ) method. These two methods are the only ConditionManager methods used in the relationship with the class Condition. Other methods are used with other classes and are described below. When DetectingApplication detects that a condition state has changed, it notifies ConditionManager of the change by passing a copy of the Condition object with the setConditionTrue( ) method. When such notification occurs, ConditionManager uses these methods to effect the change in the appropriate Condition object. Thus, not only does the detecting application set a condition to true or false, but it also sets the attributes of the condition to their proper values.

In particular, the DetectingApplication notifies the ConditionManager object when a condition is to be set to a value of true or false. FIG. 13 shows that the class ConditionManager is designed to have a "has" relationship with a core class called Stack of Condition Pointers. The square block in the class cloud for the Stack of Condition Pointers indicates that the stack class is generic and is being used to hold Condition Pointers. The Stack of Condition Pointers contains pointers to the objects comprising the current set of true conditions. The Condition class is designed to have a "has" relationship with the Stack of Condition Pointers because each condition object will be associated with a condition pointer. A condition pointer permits the ConditionManager to retrieve the data associated with any condition object from the appropriate location in computer system memory. The square rectangular box in each of these two class clouds indicates parameters that will associate the conditions and their respective pointers.

Figure 14:
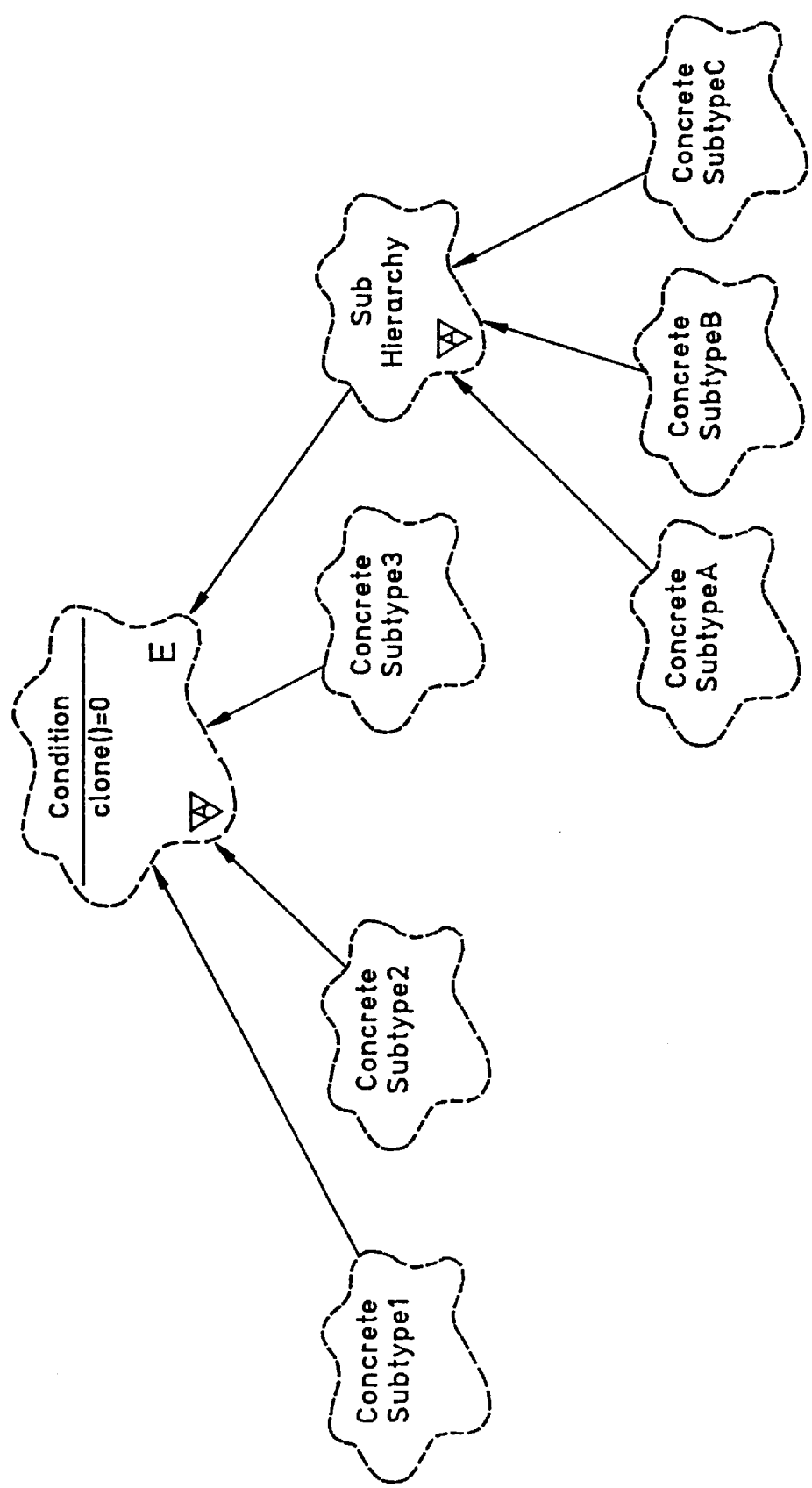
FIG. 14 is a class diagram representation of the Conditions category implemented by the computer processing system illustrated in FIG. 8.

FIG. 14 shows further details of the Condition category and indicates that the category is a hierarchy of condition objects, where each condition has the ability to clone itself. Thus, the abstract base class Condition (indicated by the "A" within a triangle in the class cloud) is shown with a method called clone( ). Because the clone( ) method is set equal to zero, it has no implementation in the base class. That is, all Condition subtypes must support this method (the ability to clone themselves). FIG. 14 shows multiple classes called Concrete Subtype1, Concrete Subtype2, and so forth. Each of these classes may be characterized as a subtype class. In general then, a subtype of Condition has an inheritance relationship with the Condition class, meaning that it is derived from the Condition. The class Sub Hierarchy indicates that the framework user may use inheritance to design and organize the conditions as desired. There is nothing that restricts the user to only subtyping one level under the Condition class. All of the classes shown in FIG. 14 are examples of framework extensions that are supplied by the framework user. That is, the user will not be creating condition objects, but will be creating specific condition subtypes.

The class structure exemplified by FIG. 14 is the means by which one of the advantageous features of the framework described herein is achieved, which is that a single ConditionManager object can manage all of the condition objects associated with the expert system regardless of their subtype, tracking the state of conditions and interrogating the conditions with knowledge base rules to determine appropriate action. Any operations that would be conducted on the conditions can also be conducted on the condition subtypes. This makes development of the inference mechanism easier and simplifies its interface with the knowledge base rules.

The data structures described above for the framework, and their interaction in the expert system tailored by the framework user, will be better understood in the context of particular examples. These examples present classes and methods that might be provided for expert systems developed for particular knowledge bases. In this way, the framework described in conjunction with the preferred embodiment provides a shell that utilizes the particular conditions and rules developed by the framework user and, when operating on the conditions and rules, provides a complete expert system.

Figure 15:
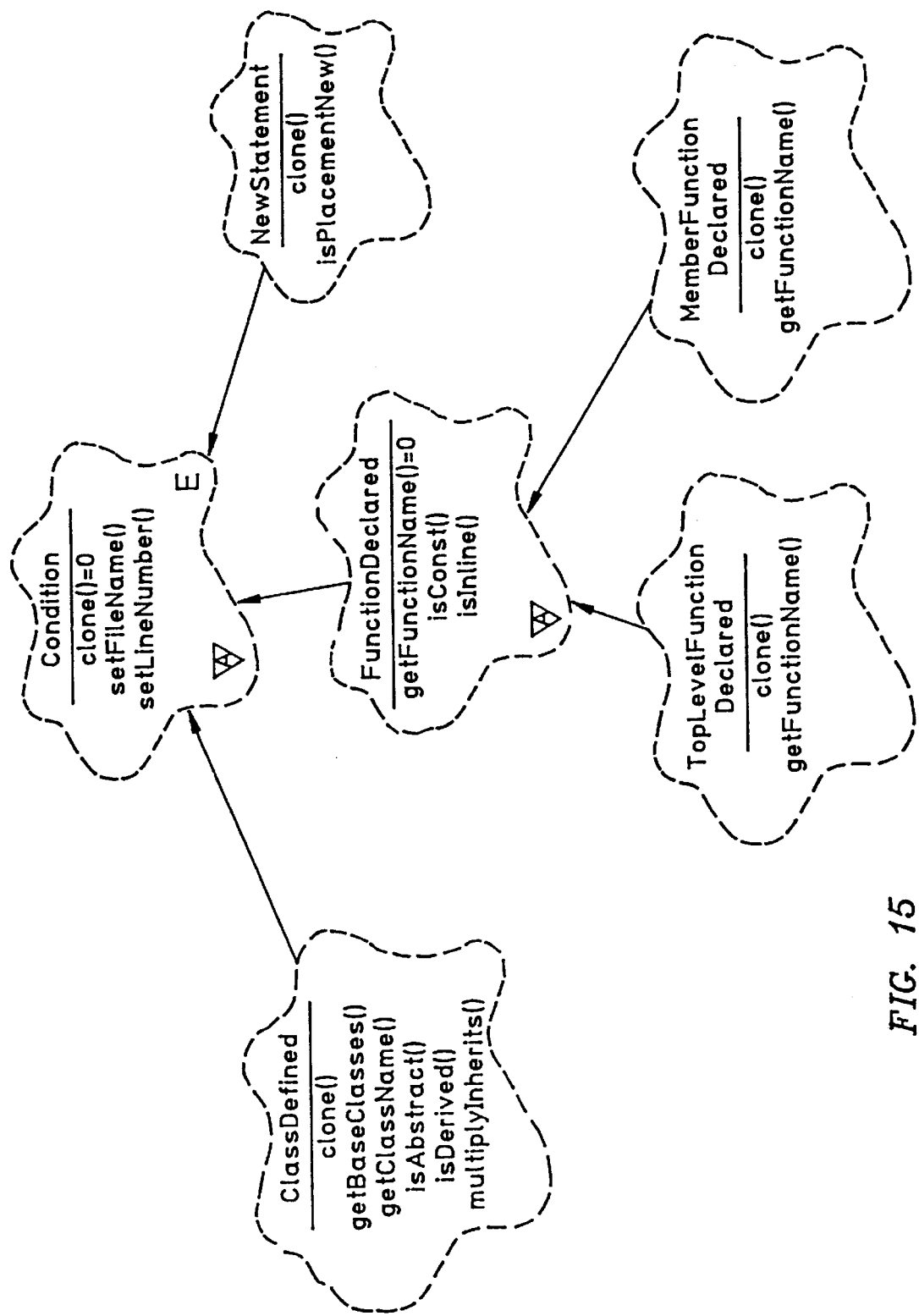
FIG. 15 is a class diagram representation of an exemplary Conditions category implemented by the computer processing system illustrated in FIG. 8.

FIG. 15 shows an example of the Condition classes in an embodiment where they have been customized for an expert system that analyzes computer program code written in the C++ programming language. FIG. 15 shows a base Condition class with the clone( ) method (for cloning additional condition subclasses) and with methods called setFileName( ) and setLineNumber( ). The setFileName( ) method permits the Detector to set the program file name on which the condition was found and the setLineNumber( ) method permits the detecting application to set the program line number on which the condition occurred. It should be apparent from FIG. 15 that the user of the framework has provided a set of condition classes with an "inheritance" relationship to the Condition class, comprising classes called ClassDefined, FunctionDeclared, and NewStatement. These condition classes illustrate the type of customization possible with the framework of the present invention. In general, the framework user with expertise in the knowledge base being developed will have sufficient information to develop the condition classes without further explanation. A typical number of condition classes produced by a framework developer might be, for example, fifty to sixty classes. Three exemplary condition classes are shown in FIG. 15 for purposes of illustration.

The ClassDefined condition class is used to record conditions where a C++ class is defined in a program and therefore includes methods called getBaseClasses( ), getClassName( ), is Abstract( ), is Derived( ), and multiplyInherits( ) to provide additional information about the class definition. These methods should be readily apparent to those skilled in the art as features of the C++ language that are relevant to proper C++ code analysis. For example, if the computer system enforces the convention that C++ class names start with an uppercase letter, then the method getClassName( ) might check to ensure that this is the case. The NewStatement class shown in FIG. 15 includes methods called clone( ) and is PlacementNew( ). The method is PlacementNew( ) is applied to determine if a C++ new statement is a standard new statement or a placement new statement. These C++ features will be known to those skilled in the C++ programming art without further explanation and are intended to illustrate that the condition classes can contain methods tailored to the particular expert system being developed.

The FIG. 15 class FunctionDeclared includes methods called get FunctionName( )=0, is const( ), and is Inline( ). The latter two methods will be recognized by those skilled in the art as C++ features that are relevant to proper C++ code analysis, again, they are provided for the purpose of illustration. The method getFunctionName( ) is set equal to zero and therefore is a pure virtual function that is not implemented at this level. Thus, FIG. 15 shows that the FunctionDeclared class has an "inheritance" relationship with two condition subclasses called TopLevelFunctionDeclared and MemberFunctionDeclared. These subclasses both inherit the methods isConst( ) and isinline( ) from the FunctionDeclared class, and they both must also implement the getFunctionName( ) method.

The TopLevelFunctionDeclared and the MemberFunctionDeclared subclasses both have methods called clone( ) and getFunctionName( ). Those skilled in the art will appreciate that the clone( ) method is a C++ feature that returns a condition object of the specific type so that methods that only exist for the type can be leveraged. The ConditionManager handles all conditions as members of the Condition type. The clone( ) method takes any condition and produces a copy whose type is more specific than Condition. Each class produces a getFunctionName( ) output that is appropriate to the class. For example, the getFunctionName( ) method of the TopLevelFunctionDeclared class returns a top level function name, and the getFunctionName( ) method of the MemberFunctionDeclared class returns the name of a function class and a member function, both C++ programming features that will be known to those skilled in the art.

Figure 16:
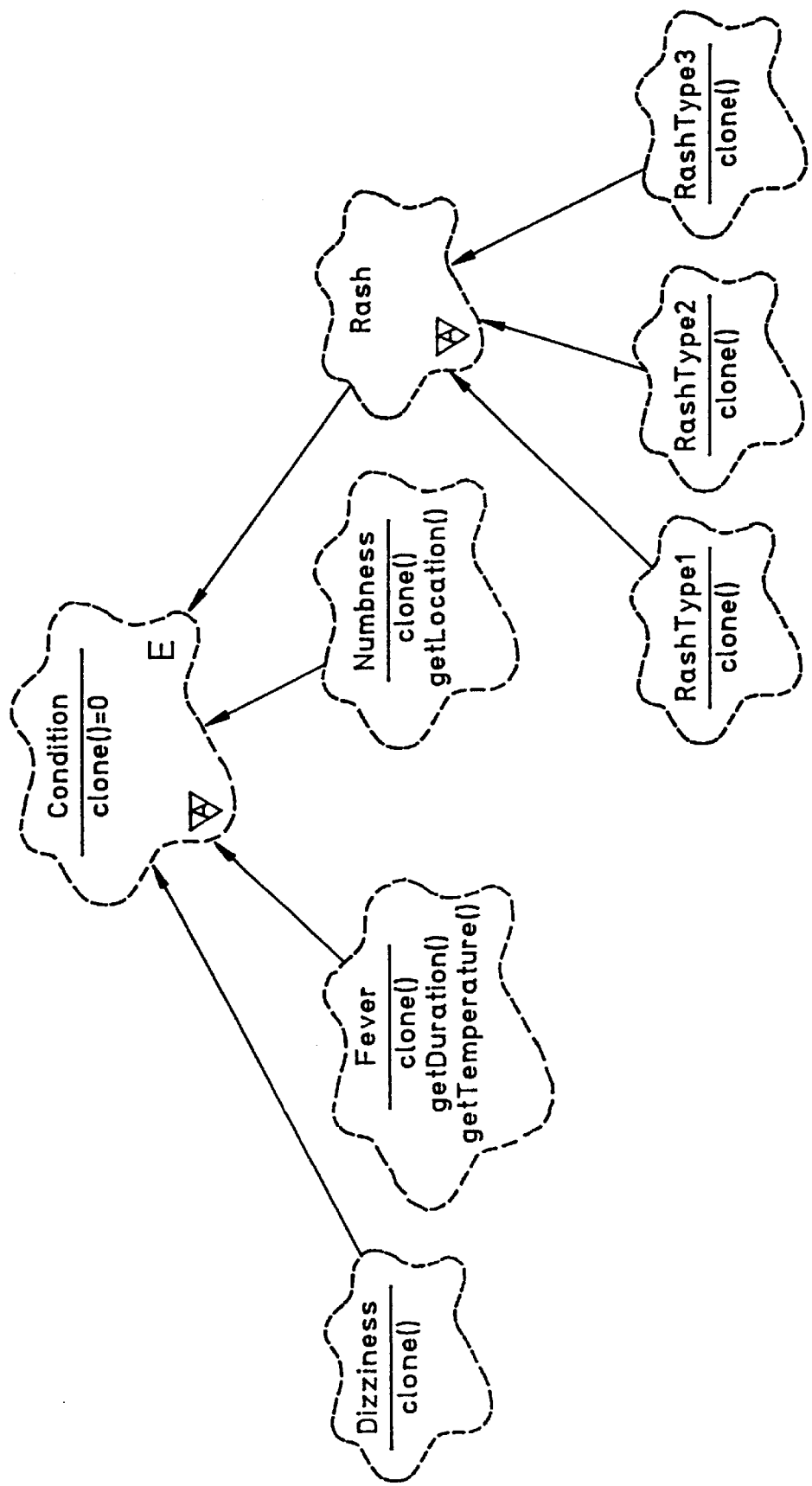
FIG. 16 is a class diagram representation of an exemplary Conditions category for a medical diagnosis expert system implemented by the computer processing system illustrated in FIG. 8.

FIG. 16 is an example of the Condition classes for a medical diagnosis expert system implemented in accordance with the invention. Some of the likely Condition classes are shown in FIG. 16, but it should be understood that an actual implementation of a medical diagnosis expert system likely would include many additional classes. The four condition classes shown in FIG. 16 are provided for purposes of illustration only.

In FIG. 16, the class Condition is shown with an "inheritance" relationship to classes called Dizziness, Fever, Numbness, and Rash. FIG. 16 shows sub-type classes of the Rash condition class that are called RashType1, RashType2, and RashType3. Any one of the condition subclasses also might include additional methods associated with attributes that might describe the condition. In the case of the Fever class, for example, methods called getDuration( ) and getTemperature( ) also are provided. These two methods obtain the duration of the fever condition and the temperature exhibited by the patient, respectively. Similarly, the Numbness condition includes a method called getLocation( ) to obtain the location of the numbness.

The Rash condition class is illustrated as an abstract base class and includes an inheritance relationship with the three condition subclasses RashType1, RashType2, and RashType3. These class clouds are examples of the type of customization possible with the condition and rule structure supported by the framework. It should be apparent that rules associated with the fever and rash condition can make use of multiple levels of if-then-else condition checking, as described above in conjunction with FIG. 10.

Figure 17:
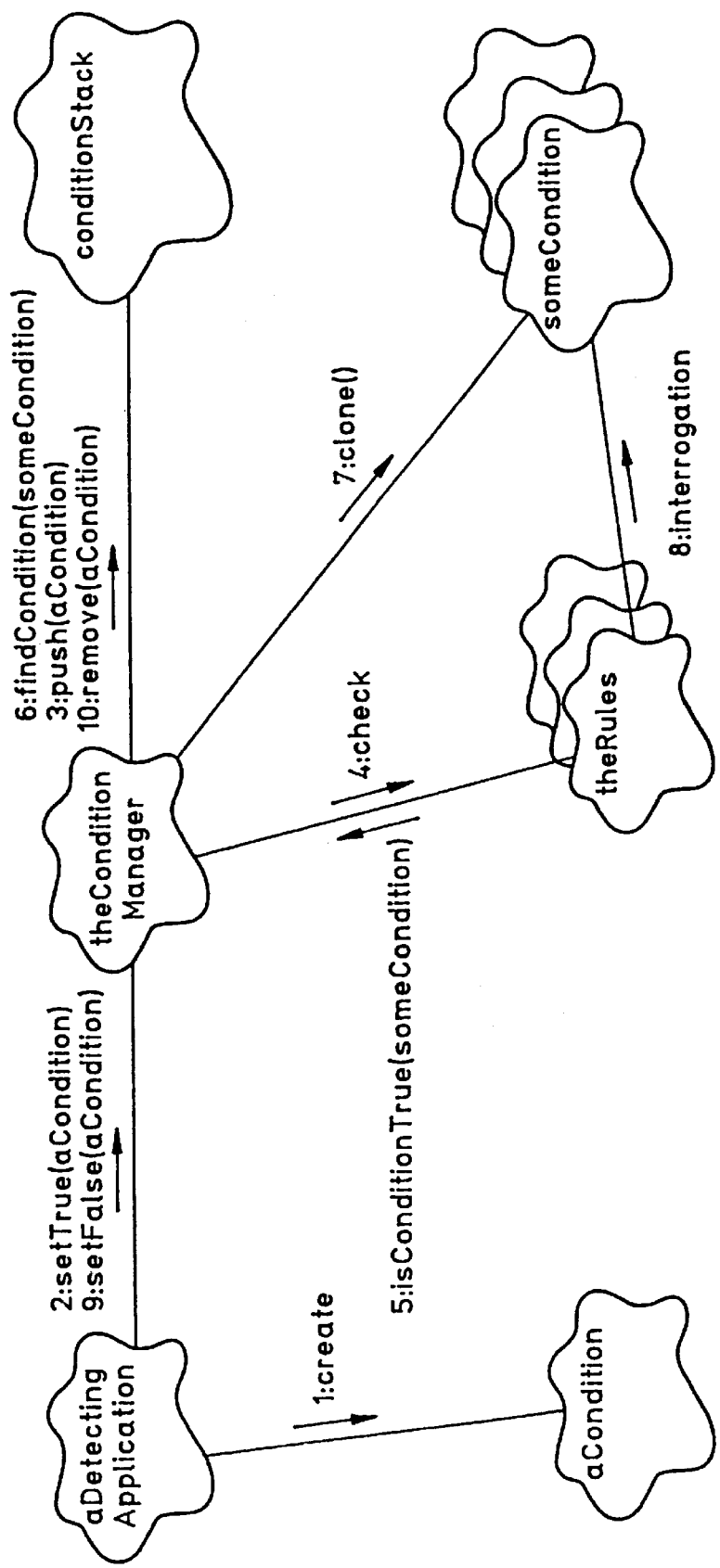
FIG. 17 is a scenario diagram representation of the processing steps executed by the host processor illustrated in FIG. 8 when detecting a condition.

The operating steps performed by the expert system constructed in accordance with the invention will be better understood with reference to object diagrams, which those skilled in the art will appreciate show the processing for an object oriented programming implementation having the object classes and compiled as described above. FIG. 17 is a top-level object-scenario diagram for the framework implemented in the computer system illustrated in FIG. 8. FIG. 17 is a scenario that shows how a detecting application sets a condition to be true and shows the resulting actions that are performed in the framework mechanism.

FIG. 17 shows that processing of the framework begins with the creation of a Condition object of some concrete type, indicated by the connecting line from the object cloud aDetectingApplication to the object cloud aCondition with the arrow labelled "1: create". That is, the detecting application will create a condition object of some concrete type, filling in all of the data needed to make the condition complete. In the preferred embodiment, the framework is implemented in a computer system with the C++ programming language. Those skilled in the art will understand that the create process is typically a C++ constructor that creates C++ objects.

As noted above, the detecting application can be a user interface and is not necessarily a class object. The legend "2: setTrue(aCondition)" on the connecting line from the object cloud aDetectingApplication to the object cloud theConditionManager indicates the second step, which is to set the condition object created by the detecting application to true. This second step comprises the detecting application using the ConditionManager to set the condition to true. The concrete condition object that was created gets passed as a parameter in this method.

The next step is for the ConditionManager object to push the created condition onto the top of its processing stack. This is indicated in FIG. 17 by the legend "3: push (aCondition)" on the connecting line from the class cloud theConditionManager to the class cloud conditionStack. Pushing the condition to the top of the condition stack comprises a change in the set of conditions, which causes ConditionManager to command the set of rules to check themselves. This fourth step, rule checking, is indicated by the legend "4: check" on the connecting line from theConditionManager cloud to theRules cloud. In response, the set of rules may ask theConditionManager if particular conditions used by each rule have a current value of true. Such iterative rule checking is indicated in FIG. 17 by the connecting line legend "5: isConditionTrue (someCondition)" from theRules to theConditionManager.

If any conditions checked by the set of rules are true, then theConditionManager materializes the conditions from the condition stack for interrogation. This step is represented by the connecting line legend "6: findCondition (someCondition)" from theConditionManager to the conditionStack cloud. To make the methods specific to a concrete condition type available to the rules that use this concrete type, each condition is cloned when it is located. This step is represented by "7: clone( )" in FIG. 17. Cloning copies the condition object, but changes its type. That is, the cloning method changes the apparent type of the condition, which is the base class Condition, to its actual condition type. Such specific conditions, found to be true, may be interrogated by the set of rules in accordance with the state of the conditions and the characteristics of the rules. The interrogation step is indicated by "8: interrogation".

The results of the rule checking and the interrogation may result in the system taking some action. Such action will be specified by the user in customizing the system by the rule clauses. In the C++ program code analysis example, if a program statement being parsed contains a predefined C++ function, then the action might be to call the appropriate routine. At some later time, the detecting application may set the condition to be false. This is indicated in FIG. 17 by "9: setFalse(aCondition)" on the connecting line leading from aDetectingApplication to theConditionManager. As a result of this, the condition is removed from the condition stack. The removal is indicated by "10: remove(aCondition)".

Figure 18:
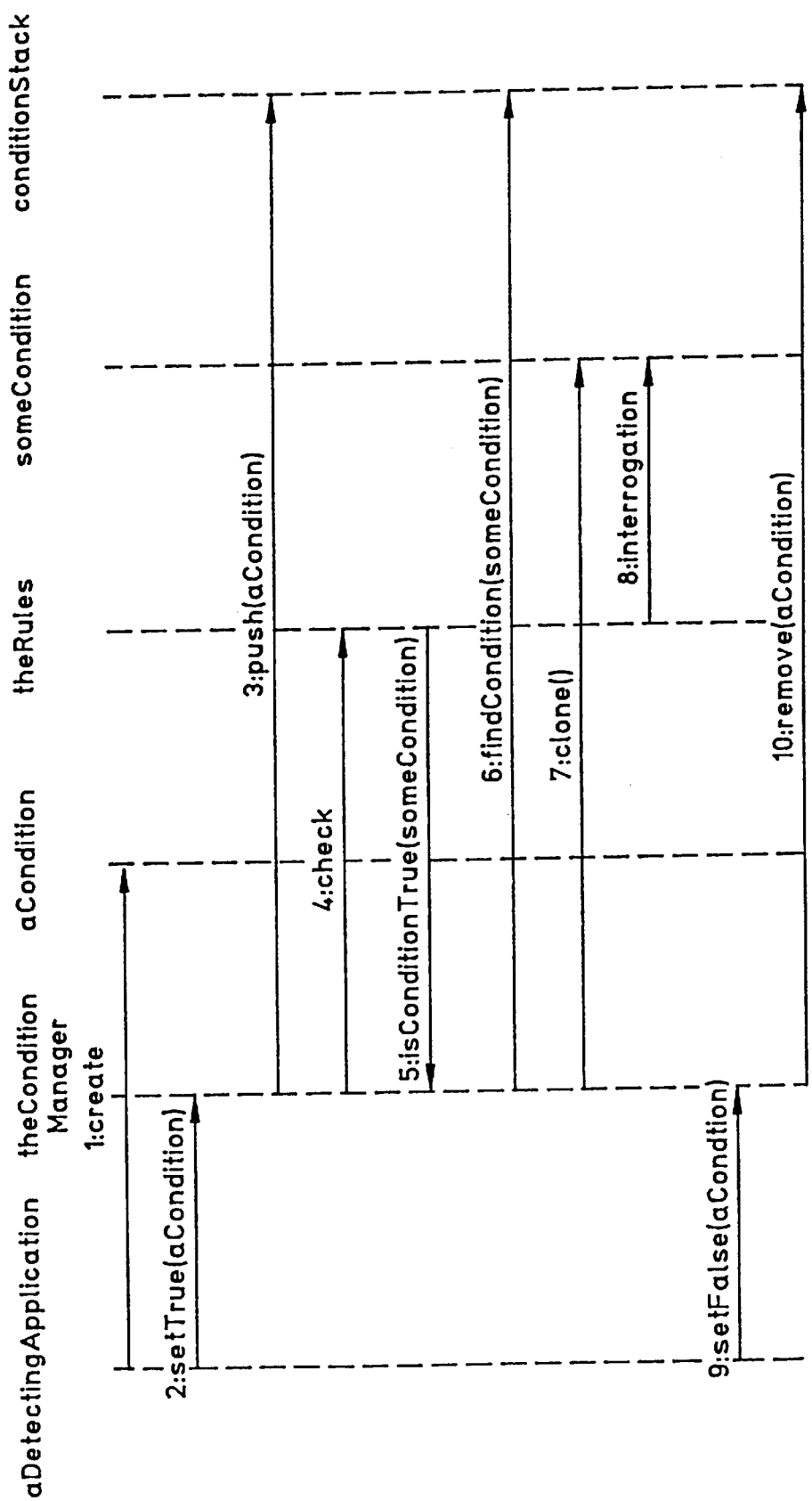
FIG. 18 is an interaction diagram representation of the processing steps executed by the host processor illustrated in FIG. 8 when detecting a condition.

FIG. 18 is an object-interaction diagram that those skilled in the art will recognize corresponds to all of the scenario information shown in FIG. 17. That is, FIG. 18 is another way of showing all the information described above in conjunction with FIG. 17. Accordingly, except for using object names with extending vertical dashed lines in place of object clouds, the operating description above for FIG. 17 can be applied directly to FIG. 18.

Figure 19:
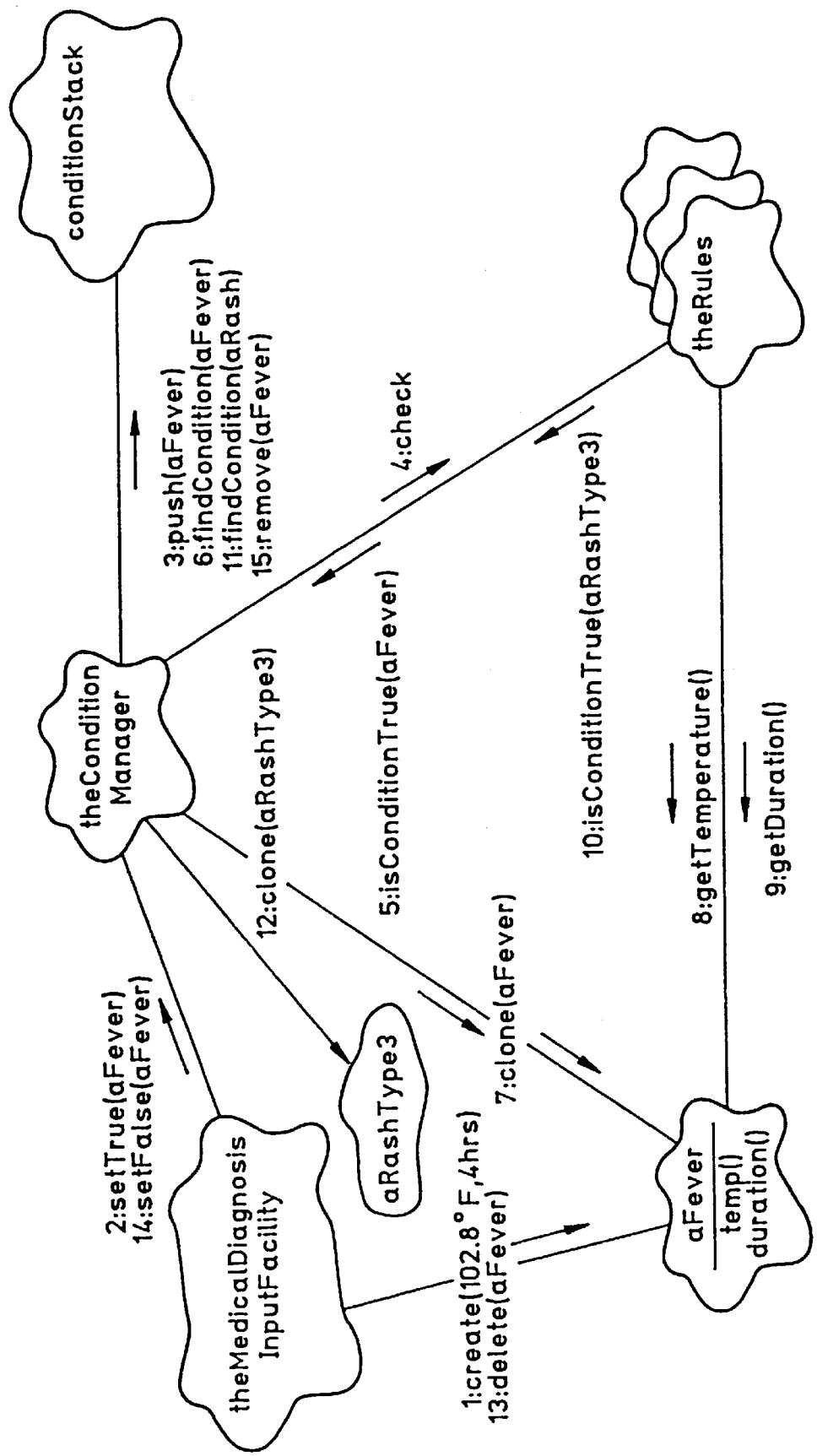
FIG. 19 is a scenario diagram representation for the medical diagnosis expert system, corresponding to the class diagram of FIG. 16, showing the processing steps executed by the host processor illustrated in FIG. 8 when detecting a condition.

FIG. 19 is an object-scenario diagram for an exemplary scenario of condition detection and rule checking for an expert system developed using the framework to provide medical diagnosis of a patient. In FIG. 19, the detecting application is represented by the object cloud called the MedicalDiagnosisInputFacility. The processing steps begin with a user providing input information that the patient has a fever and entering the requested information and appropriate data. This processing is represented by the legend "1: create(102.8° F., 4 hrs)", which indicates a fever temperature of 102.8° F. and a fever persistence of four hours duration. The detecting application tells the condition manager (represented in FIG. 19 by theConditionManager object cloud) to set the fever condition to true. This step is represented by the legend "2: setTrue(aFever)" on the connecting line from the object cloud the MedicalDiagnosisInputFacility to theConditionManager.

In response to the command to set the fever condition, theConditionManager places the fever condition on the conditionStack. This is step 3, labelled "3: push(aFever)" on the connecting line from theConditionManager to the conditionStack. In this way, all of the rules will be able to ascertain that a fever condition is present. In response to stacking the new condition, theConditionManager orders a rules check, the fourth step, which is indicated by "4: check" on the connecting line from theConditionManager to theRules. Note that theRules is represented as multiple object clouds to indicate the potential multiplicity of rules in theRules set. In the exemplary processing, one of the rules corresponds to a fever check. The rules check, a message to theConditionManager object by an appropriate one of theRules, determines if a fever is present. This processing is represented by the legend "5: isConditionTrue(aFever)" on the connecting line from theRules to theConditionManager.

If the fever condition is true, then the set of theRules would next find out more about the fever condition by interrogating the conditions that form the condition stack. This step is represented by the legend "6: findCondition (aFever)" on the connecting line from theConditionManager cloud to the conditionStack cloud. In response, theConditionManager causes a fever object to be cloned, as represented by "7: clone(aFever)" on the connecting line from theConditionManager to the object cloud aFever. The legends "8: getTemperature( )" and "9: getDuration( )" indicate that the rules are causing the getTemperature( ) and getDuration( ) methods of the aFever object to return their respective attributes. Based on the temperature and duration information returned, the rules might further ask theConditionManager to check for a rash condition. This step is indicated by the legend "10: isConditionTrue(aRashType3)" on the connecting line from theRules cloud to theConditionManager cloud. In response, theConditionManager locates a condition called Rash, as indicated by the legend "11: findCondition(aRash)" on the connecting line from theConditionManager to conditionStack.

In response to finding the rash condition object, theConditionManager produces a rash object of the appropriate type, as indicated by the legend "12: clone(aRashType3)" on the connecting line from theConditionManager to aRashType3. If the fever condition subsides and patient temperature returns to normal, this fact is made known by the input facility by deleting the fever condition. This processing is represented by the legend "13: delete(aFever)" on the connecting line from the MedicalDiagnosisInputFacility to aFever. In accordance with deleting the fever condition object, theMedicalDiagnosisInputFacility also directs theConditionManager to set the fever condition to false. This step is represented by the legend "14: setFalse(aFever)" on the line from theMedicalDiagnosisInputFacility to theConditionManager. This last step finally results in removing the fever from the condition stack, as represented by the legend "15: remove(aFever)" on the connecting line from theConditionManager to conditionStack.

Figure 20:
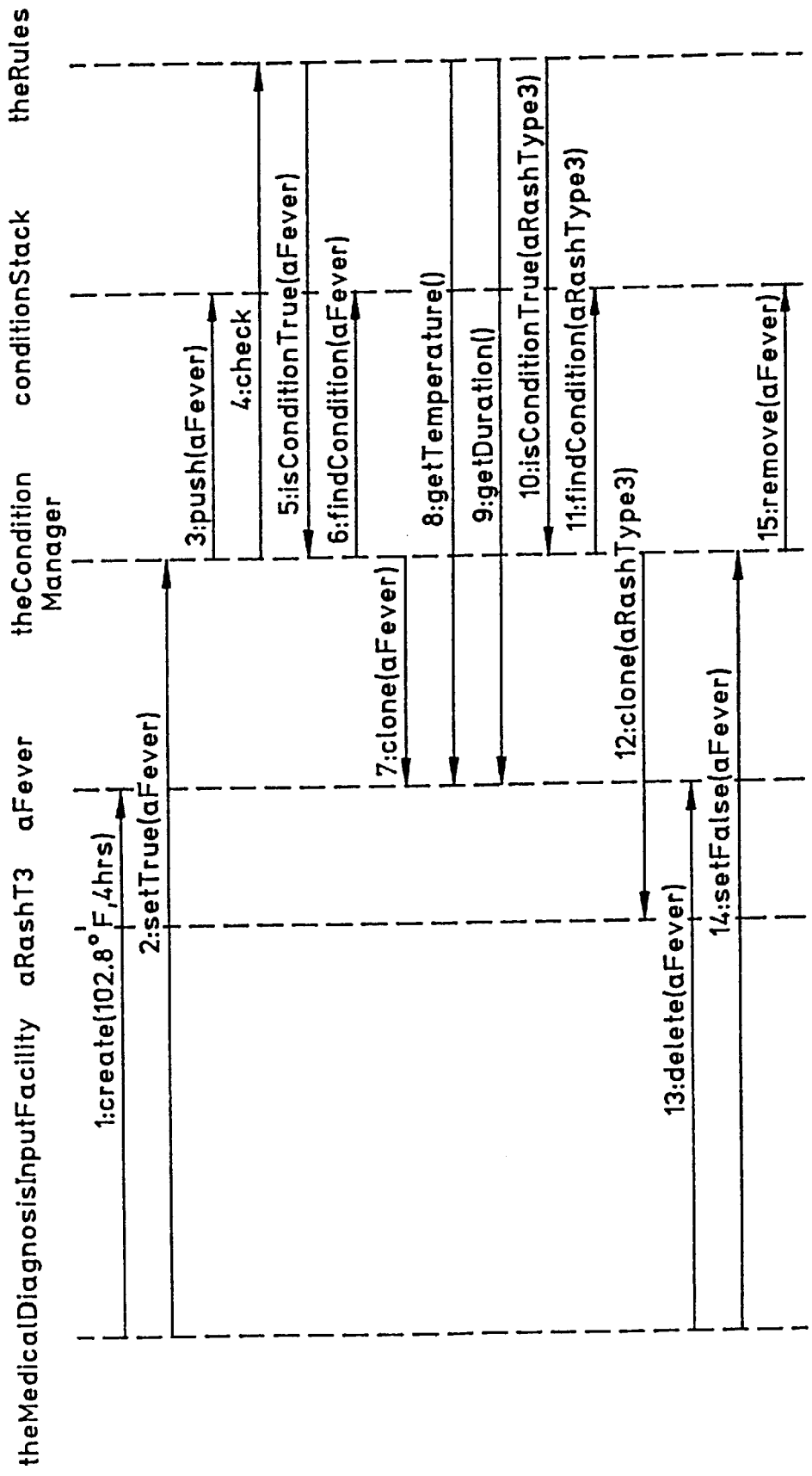
FIG. 20 is an interaction diagram representation for the medical diagnosis expert system, corresponding to the class diagram of FIG. 16, showing the processing steps executed by the host processor illustrated in FIG. 8 when detecting a condition.

FIG. 20 is an object-interaction diagram that those skilled in the art will recognize corresponds to all of the scenario information shown in FIG. 19. That is, FIG. 20 is another way of showing all the information described above in conjunction with FIG. 19. Accordingly, except for using class names with extending vertical dashed lines in place of class clouds, the operating description above for FIG. 19 can be applied directly to FIG. 20.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

Notation

There is, as yet, no uniformly accepted notation for communicating objectoriented programming ideas. The notation used in this specification is very similar to that known in the programming industry as Booch notation, after Grady Booch. Mr. Booch is the author of *Object-Oriented Analysis and Design With Applications,* 2 d ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labelled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation or method names followed by parentheses, and constraints that are enclosed within brackets. FIG. 3 illustrates the class Zoo Administrator in greater detail. FIG. 3 indicates that the Zoo Administrator class includes multiple operations, including ones called "5_minute-timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation or method, referred to as the client, to the object that provides the operation, referred to as the supplier. Such a representation of a simple synchronization relationship denotes the simplest form of message-passing. Such an association can indicate, for example, the invocation of an operation. Parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. An apparatus comprising:
   at least one processor;
   a memory coupled to the at least one processor; and
   an object oriented framework mechanism residing in the memory and executed by the at least one processor, the framework mechanism comprising:
      a user-extensible condition class that defines state data;
      a user-extensible rule class that defines a plurality of user-defined rules that define a knowledge base, each rule specifying a corresponding computer system action to be executed if the state data of an instance of the condition class satisfies the rule; and
      a condition manager class that is not user-extensible, an instance of the condition manager class determining if at least one instance of the rule class is satisfied by the state data of any instance of the condition class, and if so, the instance of the condition manager class initiating the corresponding computer system action.

2. The apparatus of claim 1 wherein the framework mechanism further comprises a detector class that identifies a changed state of an instance of the condition class to an instance of the condition manager class.

3. The apparatus of claim 1 wherein the plurality of user-defined rules comprise a set of if-then-else statements that describe the knowledge base.

4. The apparatus of claim 1 wherein the framework mechanism further comprises a rules compiler that compiles the plurality of user-defined rules to produce an executable tailored rules based expert system program that communicates the outcome of its execution to a user.

5. The apparatus of claim 1 wherein the condition manager class defines:
   at least one condition manager object; and
   a set condition state object method that, when invoked, sets the state data of a specified instance of the condition class.

6. The apparatus of claim 1 further comprising a plurality of user-defined condition subclasses to the condition class.

7. An apparatus comprising:

at least one processor;

a memory coupled to the at least one processor; and an object oriented framework mechanism residing in the memory and executed by the at least one processor, the framework mechanism comprising:

a plurality of condition objects that each define state data;

a plurality of user-defined rule objects that define a knowledge base, each rule comprising at least one if-then-else statement and specifying a corresponding computer system action to be executed if the state data of a condition object satisfies the rule;

a condition manager object that determines if at least one rule object is satisfied by the state data of any condition object, and if so, the condition manager object initiating the corresponding computer system action, wherein the condition manager object includes a set condition state object method that, when invoked, sets the state data of a specified condition object;

a detector object that identifies a change in the state data of a condition object to the condition manager object; and a rules compiler that compiles the plurality of user-defined rule objects to produce an executable tailored rules based expert system program that communicates the outcome of its execution to a user.

8. A method of executing a rules-based expert system, the method comprising the steps of:

(A) providing an object oriented framework comprising:

a user-extensible condition class that defines state data;

a user-extensible rule class; and a condition manager class that is not user-extensible, wherein the condition manager class determines if at least one of the rules is satisfied by the state data of any condition, and if so, the condition manager class initiating a computer system action corresponding to each satisfied rule;

(B) extending the condition class to define a plurality of conditions;

(C) extending the rule class to define a plurality of rules that define a knowledge base, each rule specifying a corresponding computer system action to be executed if the state data of a condition satisfies the rule;

(D) executing the extended framework mechanism on a computer system, the execution of the extended framework mechanism performing the steps of:

identifying a condition object having a changed state; and interrogating one or more of the plurality of rules to determine if any of the plurality of rules are satisfied by a change in state data of the identified condition object.

9. The method of claim 8 further comprising the step of:

if any of the plurality of rules are satisfied by the change in state data of the identified condition object, initiating the computer system action corresponding to the satisfied rule.

* * * * *